(12) United States Patent
Russell

(10) Patent No.: US 8,269,090 B2
(45) Date of Patent: Sep. 18, 2012

(54) KEYBOARD PRACTICE APPARATUS

(76) Inventor: Jeremy Russell, Leeds (GB)

(*) Notice: Subject to any disclaimer, the term of this patent is extended or adjusted under 35 U.S.C. 154(b) by 110 days.

(21) Appl. No.: 12/679,462

(22) PCT Filed: Sep. 24, 2008

(86) PCT No.: PCT/GB2008/050858
§ 371 (c)(1),
(2), (4) Date: Jun. 24, 2010

(87) PCT Pub. No.: WO2009/040578
PCT Pub. Date: Apr. 2, 2009

(65) Prior Publication Data
US 2010/0251874 A1  Oct. 7, 2010

(30) Foreign Application Priority Data
Sep. 24, 2007 (GB) .................................. 0718499.7

(51) Int. Cl.
*G09B 15/06* (2006.01)
(52) U.S. Cl. ............................................. 84/469
(58) Field of Classification Search ............... 84/423 R, 84/450, 453, 469
See application file for complete search history.

(56) References Cited

U.S. PATENT DOCUMENTS

| 84,844 | A | | 12/1868 | Sangalli |
|---|---|---|---|---|
| 173,205 | A | | 2/1876 | Bohrer |
| 492,889 | A | | 3/1893 | Kirk |
| 591,800 | A | | 10/1897 | Finnblade et al. |
| 607,675 | A | | 7/1898 | Barr |
| 2,041,146 | A | | 5/1936 | Portnoff |
| 5,082,258 | A | * | 1/1992 | Niks .............................. 84/469 |
| 5,753,840 | A | * | 5/1998 | Saboia De Albuquerque . 84/453 |

FOREIGN PATENT DOCUMENTS

| EP | 0222952 | 5/1987 |
|---|---|---|
| JP | 7092898 | 4/1995 |
| WO | WO 2005/004087 | 1/2005 |

OTHER PUBLICATIONS

International Search Report and Written Opinion for PCT /GB2008/ 050858 mailed Jul. 16, 2009.

* cited by examiner

*Primary Examiner* — Kimberly Lockett
(74) *Attorney, Agent, or Firm* — Knobbe, Martens, Olson & Bear LLP

(57) ABSTRACT

A keyboard practice apparatus is provided which includes a slide member, a support member, and means for supporting the slide member in juxtaposition with a keyboard of an instrument. The support member is configured to support an arm of a user and to be slidably coupled to the slide member. The apparatus is operable to allow a player of a keyboard instrument in a seated position with a forearm resting on the support member to move their forearm along a length of the keyboard by sliding the support member along a portion of a length of the slide member.

43 Claims, 23 Drawing Sheets

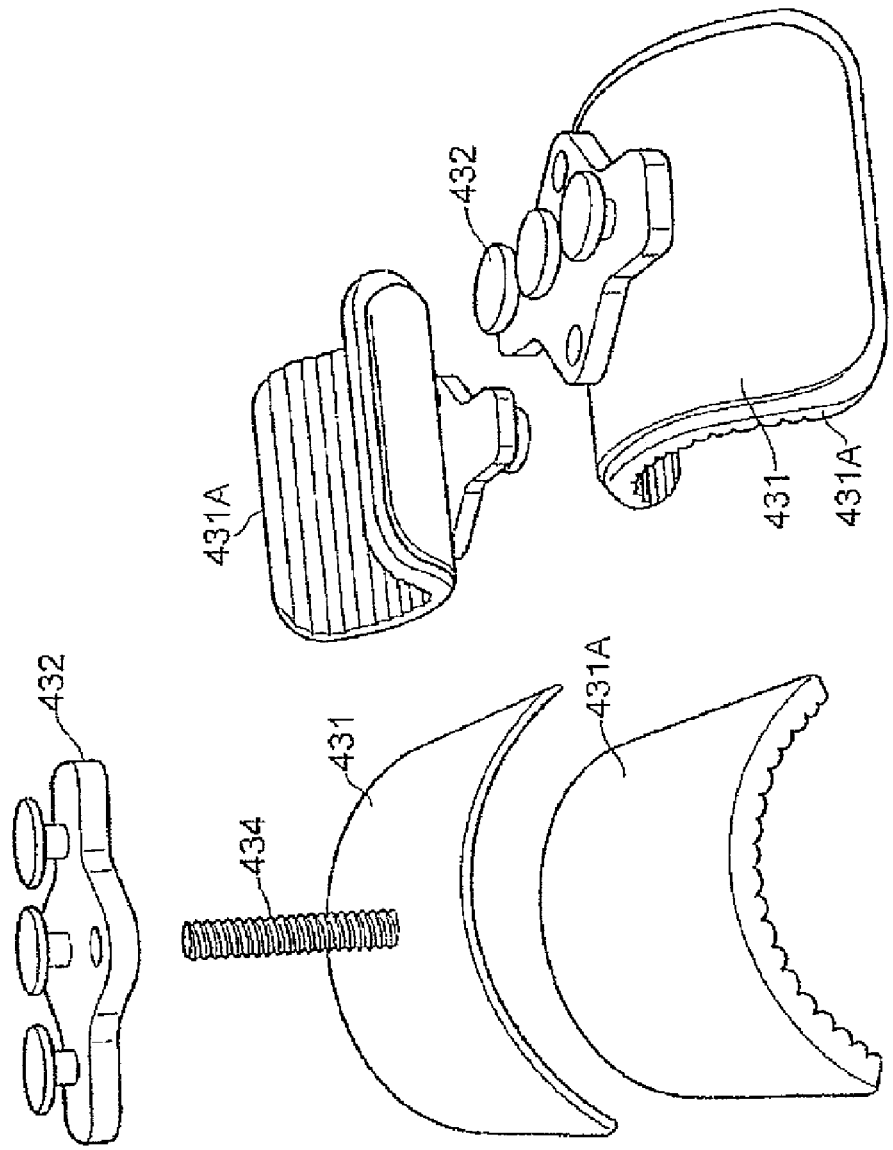

KEYBOARD PRACTICE APPARATUS

CROSS-REFERENCE TO RELATED APPLICATIONS

This application is the U.S. National Phase under 35 U.S.C. §371 of International Application No. PCT/GB2008/050858, filed Sep. 24, 2008, designating the United States and published in English on Apr. 2, 2009, as WO 2009/040578, which claims priority to United Kingdom Application No. 0718499.7, filed Sep. 24, 2007.

FIELD OF THE INVENTION

The present invention relates to keyboard practice apparatus. In particular, but not exclusively, the invention relates to keyboard practice apparatus for assisting a user in correctly positioning an arm during play.

DESCRIPTION OF RELATED ART

It is known to provide keyboard practice apparatus to assist a user in practising keyboard skills.

JP7092898 discloses a wrist position correcting device in the form of a bar provided below a correct level of a player's wrist when playing a keyboard instrument. In the event that a player's wrist contacts the bar during playing of the instrument, a player is alerted to the fact that their wrist is too low by their sense of touch.

However, this device has the disadvantage that it only provides an indication of incorrect wrist position when a user's wrist is lowered to an undesirable position. Furthermore the device does not assist a user in correctly positioning their arm or wrist other than at or above a predetermined height.

WO2005/004087 discloses a musical teaching device and method in the form of a pair of gloves slidably attached to a carriage and movable by means of an electric motor along the length of the carriage. The device is configured to move the arms and hands of a player sequentially to the left and right, and up or down to the correct positions for the playing of a piece of music. The player's fingers are also lightly pulled down to sound the correct notes of the piece of music.

Such as device is cumbersome to use since the device itself moves the hands and fingers of the user to a correct location on the keyboard for the sounding of notes. The device has the disadvantage that a player may become reliant on the device in order to correctly locate and sound a note.

SUMMARY

In a first aspect of the present invention there is provided keyboard practice apparatus comprising:
 a slide member;
 a support member configured to support an arm of a user, the support member being slidably coupled to the slide member; and
 means for supporting the slide member in juxtaposition with a keyboard of an instrument,
 the apparatus being operable to allow a player of a keyboard instrument in a seated position with a forearm resting on the support member to move their forearm along a length of the keyboard by sliding the support member along a portion of a length of the slide member.

Preferably, the apparatus is configurable to allow the support member to be reciprocally slidable along the slide member in a substantially straight path such that the forearm of the user maintains a generally constant distance from a forward edge of the keyboard.

Thus, in some embodiments of the invention the support member is arranged to support the arm of the user such that sliding movement of the arm with respect to the support member is substantially prevented. Thus, the support member may be provided with a surface arranged to prevent sliding between the user's arm and the support member. For example, a high friction surface such as an elastomeric material, natural rubber, cloth, leather, a plastics material or any other suitable material.

In some embodiments the apparatus is configurable such that the forearm of the user maintains a generally constant distance above the forward edge of the keyboard.

Certain embodiments of the invention have the advantage that a forearm of a user may be maintained at a predetermined distance from a forward edge of the keyboard at all times whilst a user is playing the instrument. The apparatus allows the user to move their forearm freely up and down the keyboard, along the slide member, to play different notes in sequence, without a risk that the distance of the forearm from the forward edge of the keyboard will change substantially from a predetermined distance.

The present inventor has recognised the importance of a player's arm maintaining a substantially constant distance from the keyboard during the course of play. The present invention overcomes the problem of lateral movement of one or both arms of a user towards and away from the keyboard. Such movement is generally detrimental to a player's development of their skill at playing a keyboard instrument.

Embodiments of the invention enable a user to maintain one or both arms in an orientation generally normal to the keyboard during play as the arm moves up and down the keyboard. This feature, in combination with the feature of enabling a user to maintain their arm substantially a constant distance from a forward edge of the keyboard during the course of play, enables a user to develop more quickly and efficiently a correct keyboard technique when playing scales and arpeggios.

By maintaining the forearm of the user substantially a constant distance from the forward edge of the keyboard and in an orientation substantially normal to the keyboard, a thumb of the user may be arranged to move up and down the keyboard over the keyboard substantially a constant distance from the forward edge of the keyboard. By maintaining the forearm of the user substantially normal to the keyboard the user's hand is substantially prevented from being rotated about a vertical axis so that the user's little finger no longer overlies the keyboard. Such rotation of the hand is not conducive to good keyboard technique and is to be avoided. Thus, embodiments of the present invention assist a user in unlearning or preventing the development of bad habits in keyboard practice technique.

Embodiments of the invention are particularly useful in assisting a user in developing their skills at playing scales and arpeggios on a keyboard instrument.

Preferably, the apparatus is configurable to allow the support member to be reciprocally slidable along the slide member at a substantially constant vertical height with respect to the keyboard.

Alternatively or in addition the apparatus may be configurable to allow the support member to be reciprocally slidable along the slide member in a generally curved path.

Preferably the apparatus is configurable to allow the support member to be reciprocally slidable along the slide member at a substantially constant lateral distance from a forward edge of the keyboard.

Preferably the support member is removably attachable to the slide member.

Preferably the support member is removably attachable to the slide member by means of a quick release mechanism.

This feature allows replacement of the support member with a support member of a different size or shape, Alternative designs of support member or other members may also be substituted for or provided in addition to the support member described above.

Preferably the support member is attachable to the slide member by means of a carriage member slidable along the slide member.

Preferably the support member is removably attachable to the carriage member.

More preferably the support member is removably attachable to the carriage member by means of a quick release mechanism.

A carriage member provides a convenient means for allowing the support member to move with respect to keys of the keyboard.

Preferably the slide member comprises at least one track member, the carriage member being configured to be coupled to the track member.

Preferably the support means is configured to allow the apparatus to be attached to a keyboard instrument thereby to support the slide member in juxtaposition with the keyboard.

Preferably the support means is configured to allow the apparatus to be removably attached to the instrument.

This feature has the advantage that the apparatus can be removed from the instrument when it is not required to be used.

Preferably the apparatus is arranged to be leaned against a keyboard instrument whereby the apparatus may be supported in a substantially upright orientation.

Alternatively or in addition the support means may be configured to allow the apparatus to be positioned in a free-standing configuration.

Preferably a lateral distance of the slide member from the keyboard may be adjusted.

Preferably the lateral distance of the slide member from the keyboard may be adjusted by means of a screw mechanism.

Preferably a vertical height of the slide member with respect to the keyboard may be adjusted, preferably by means of a screw mechanism.

Preferably the support member is configured to be rotatable with respect to the slide member about an axis, preferably a vertical axis.

This feature has the advantage that the slide member can rotate to accommodate a small amount of rotation of a user's arm as the arm moves along the keyboard with the user in a fixed seated position.

According to a second aspect of the invention there is provided keyboard practice apparatus suitable for assisting the development of a player of a keyboard instrument comprising:
 a base member;
 a support member having means for supporting a forearm of a user when the user is seated with their arm in an orientation substantially corresponding to that during normal play; and
 rotator apparatus, the rotator apparatus being configured to allow a wrist of a user's forearm coupled to the support member to describe generally circular or elliptical translational motion in a vertical plane.

The apparatus may be further arranged to maintain the support member in a generally upright orientation throughout a cycle of circular or elliptical translational motion.

Preferably the rotator apparatus comprises a parallel linkage mechanism.

Preferably at least one of the linkages of the linkage mechanism is provided in the form of a rotatable disc element.

Preferably a pair of generally parallel linkages of the parallel linkage mechanism are provided by a corresponding pair of mutually spaced apart, rotatable disc elements, the disc elements being configured to be rotatable about mutually parallel axes.

Preferably the disc elements are rotatably coupled to the base member.

The disc elements may be rotatably coupled to a swivel member, the swivel member being configured to be rotatable with respect to the base member about a generally upright axis with the apparatus oriented for normal use.

Preferably the support member according to the first or second aspects of the invention is in the form of a generally U shaped member arranged to provide a comfortable rest for the arm of the user.

A generally U-shaped member is found to be a particularly convenient and comfortable shape for a support member according to embodiments of the invention. An arm of a user can be readily positioned in and withdrawn from a U-shaped member.

Furthermore, a U-shaped member may be configured to allow lateral force to be exerted on rising portions of the member as a user translates their forearm along the slide member. This enables the carriage member to be moved in a more comfortable manner, rather than relying on a frictional force between a lower surface of a forearm of the user and the carriage member.

The support member may comprise at least one pad portion arranged to be positioned at at least one location selected from amongst beneath the arm of the user and at one or both sides of the arm of the user.

This feature has the advantage that a level of comfort enjoyed by a user of the apparatus during play is increased.

Preferably a position of the pad member with respect to the support member may be adjusted in a vertical and/or a horizontal plane.

Preferably, the support member is rotatable about an axis, preferably a generally vertical axis.

The apparatus may comprise two support members. The apparatus may comprise more than two support members.

In some embodiments having two support members the two support members may be coupled to one another such sliding of one support member along the slide member causes sliding of the other support member along the slide member. The support members may be resiliently coupled to one another. Preferably the support members are rigidly coupled to one another.

The apparatus may further comprise a handrest member configured to support a hand of the user when a corresponding arm of the user is resting on the support member.

This has the advantage that a user may be encouraged to play a keyboard with their hand shaped in an exemplary manner.

Preferably the handrest member is connected to the support member.

Preferably the handrest member is removably connected to the support member, more preferably by means of a quick release mechanism.

Reference herein to a quick release mechanism includes reference to a snap-lock mechanism, a latch mechanism or any other suitable quick release mechanism.

This allows removal of the handrest member when it is desirable to use the apparatus without the handrest member. Furthermore, the handrest member may be replaced by a handrest member having a different size of shape.

Preferably the handrest member comprises a boom element connected to the support member at a first end of the boom element and a pad member connected to the support element at a second end of the boom element, the pad member being configured to contact a hand of the user thereby to support the hand.

Preferably the pad member is shaped and configured to support a palm of a user's hand.

This provides a comfortable and convenient support for a user's hand.

Apparatus according to the first aspect of the invention may further comprise rotator apparatus configured to allow a wrist of a user's forearm coupled to the support member to describe generally circular or elliptical translational motion in a vertical plane parallel to the slide member.

Preferably the rotator apparatus is further arranged to maintain the support member in a generally upright orientation throughout a cycle of circular or elliptical translational motion.

The rotator apparatus may comprise a parallel linkage mechanism.

Preferably at least one of the linkages is provided in the form of a rotatable disc element.

Preferably a pair of generally parallel linkages of the parallel linkage mechanism are provided by a corresponding pair of mutually spaced apart rotatable disc elements, the disc elements being configured to be rotatable about mutually parallel axes.

Preferably the disc elements are rotatably coupled to the carriage member.

Alternatively the disc elements may be rotatably coupled to a swivel member, the swivel member being configured to be rotatable with respect to the carriage member about a generally upright axis with the apparatus oriented for normal use.

Preferably the support member is provided with a strap member, the strap member being arranged to secure an arm of a user to the support member thereby to prevent inadvertent withdrawal of the arm of a user from the support member.

In a third aspect of the invention there is provided keyboard practice apparatus comprising: means for supporting the apparatus in juxtaposition with a keyboard instrument; and a support member arranged to support a hand of a user seated at a keyboard with their hand in juxtaposition with the keyboard in an orientation corresponding substantially to that during normal play, the support member having a base member and a rest portion, the rest portion being arranged to abut at least a portion of the user's hand, the rest portion being movably coupled to the base member thereby to allow the rest portion to describe translational and rotational motion relative to the base portion.

This apparatus has the advantage that it is operable to allow the user to move their wrist with respect to the keyboard so as to describe a corresponding circular or elliptical translational motion in a vertical plane. This is useful in assisting a user in learning a correct keyboard technique.

Preferably an orientation of the support member may be adjusted with respect to a vertical plane.

Preferably an orientation of the base member with respect to the vertical plane may be adjusted.

Preferably the base member may be pivoted about an axis substantially parallel to a forward edge of the keyboard.

Preferably the apparatus is operable to allow the rest portion to describe a substantially closed path.

More preferably the apparatus is operable to allow the rest portion to describe a substantially curved path.

The path may be circular, distorted circular, elliptical, distorted elliptical, or any other path. The path may include at least a substantially straight portion.

The rest portion may comprise a rotary member rotatable about an axis fixed with respect to the base member, the rotary member having a pad member coupled thereto, the pad member being arranged to abut a user's hand, the pad member being arranged to describe the translational and rotational motion relative to the base portion.

The rest portion may comprise a spindle having an axis of rotation and a pad member coupled to the spindle at a location displaced from the axis of rotation in a direction normal to the axis of rotation.

The axis about which the rotary member is rotatable may preferably be tilted about an axis parallel to a forward edge of the keyboard.

Preferably the base member comprises a domed portion.

Preferably the rest portion comprises a rest member slidably movable with respect to the domed portion of the base member.

The rest portion may be slidably movable with respect to the domed portion to execute a pitch and roll movement. The rest portion may be further movable to execute a yaw movement.

Preferably the rest portion is slidably movable over and in contact with the domed portion of the base member.

The rest portion may comprise an inverted cupped member having a skirt portion having a rimmed portion, the rimmed portion being arranged to be slidably movable over and in contact with the domed portion of the base member.

The rest portion may be coupled to the base member.

The rest portion may be resiliently coupled to the base member.

The rest portion is magnetically coupled to the base member.

Preferably the rest portion comprises a domed portion arranged to abut a palm of a user's hand.

The apparatus preferably comprises a slide member, the support member being slidably coupled to the slide member, the apparatus being operable to allow the user to move their hand along a length of the keyboard by sliding the support member along a portion of a length of the slide member.

Preferably the apparatus is configurable to allow the support member to be reciprocally slidable along the slide member in a substantially straight path such that the forearm of the user maintains a substantially constant distance from a forward edge of the keyboard.

This feature has the advantage that a thumb of a user may also be constrained to move in a substantially straight path a substantially constant distance from a forward edge of the keyboard.

More preferably the apparatus configurable to allow the support member to be reciprocally slidable along the slide member at a substantially constant vertical height with respect to the keyboard.

Preferably the apparatus is configurable to allow the support member to be reciprocally slidable along the slide member in a generally curved path.

The apparatus may be further configurable to allow the support member to be reciprocally slidable along the slide member at a substantially constant lateral distance from a forward edge of the keyboard.

Preferably the support member is removably attachable to the slide member.

Preferably the support member is removably attachable to the slide member by means of a quick release mechanism.

Preferably the support member is attachable to the slide member by means of a carriage member slidable along the slide member.

Preferably the support member is removably attachable to the carriage member.

The support member may be removably attachable to the carriage member by means of a quick release mechanism.

The slide member may comprise at least one track member, the carriage member being configured to be coupled to the track member.

The support means may be configured to allow the apparatus to be attached to a keyboard instrument thereby to support the slide member in juxtaposition with the keyboard.

Preferably the support means is configured to allow the apparatus to be removably attached to the instrument.

The support means may comprise at least one leg member, the apparatus being arranged to be leaned against a keyboard instrument whereby the apparatus is supported in a substantially upright orientation.

The support means may be configured to allow the apparatus to be positioned in a freestanding configuration.

The apparatus is preferably arranged whereby a lateral distance of the slide member from the keyboard may be adjusted.

Preferably the lateral distance of the slide member from the keyboard may be adjusted by means of a screw mechanism.

Preferably a vertical height of the slide member with respect to the keyboard may be adjusted, preferably by means of a screw mechanism.

The support member may be configured to be rotatable with respect to the slide member about an axis, preferably a vertical axis.

The support member is preferably slidably coupled to the slide member by means of an arm member arranged to hold the support member a substantially fixed distance away from the slide member.

The arm member is preferably arranged to project away from the slide member.

Preferably the arm member is arranged to project away from the slide member in a direction substantially normal to the slide member.

The arm member may be arranged to project away from the slide member in a direction away from a user using the apparatus.

Preferably the rest portion is movable by a user's hand to describe said substantially circular or elliptical translational motion.

Alternatively or in addition the rest portion may be movable by means of a motor to describe said substantially circular or elliptical translational motion.

Preferably guide means is provided to guide the rest portion in a predetermined path of substantially circular or elliptical translational motion.

Preferably an amount of force required to so move the rest portion may be adjusted.

In a fourth aspect of the invention there is provided a musical instrument comprising apparatus as claimed in any preceding claim.

Preferably at least the slide member is arranged to be stowed when not required.

Preferably the slide member is stowable by being retracted into, under or over a portion of the instrument.

Alternatively or in addition the slide member may be stowable by being folded into, under or over a portion of the instrument.

Preferably the entire apparatus is stowable.

Alternatively or in addition the apparatus may be provided integral to the instrument.

BRIEF DESCRIPTION OF THE FIGURES

Embodiments of the invention will now be described with reference to the accompanying figures in which:

FIGS. 19 to 22 show a support member of the apparatus of FIGS. 15 to 18;

DETAILED DESCRIPTION

Figure 1:
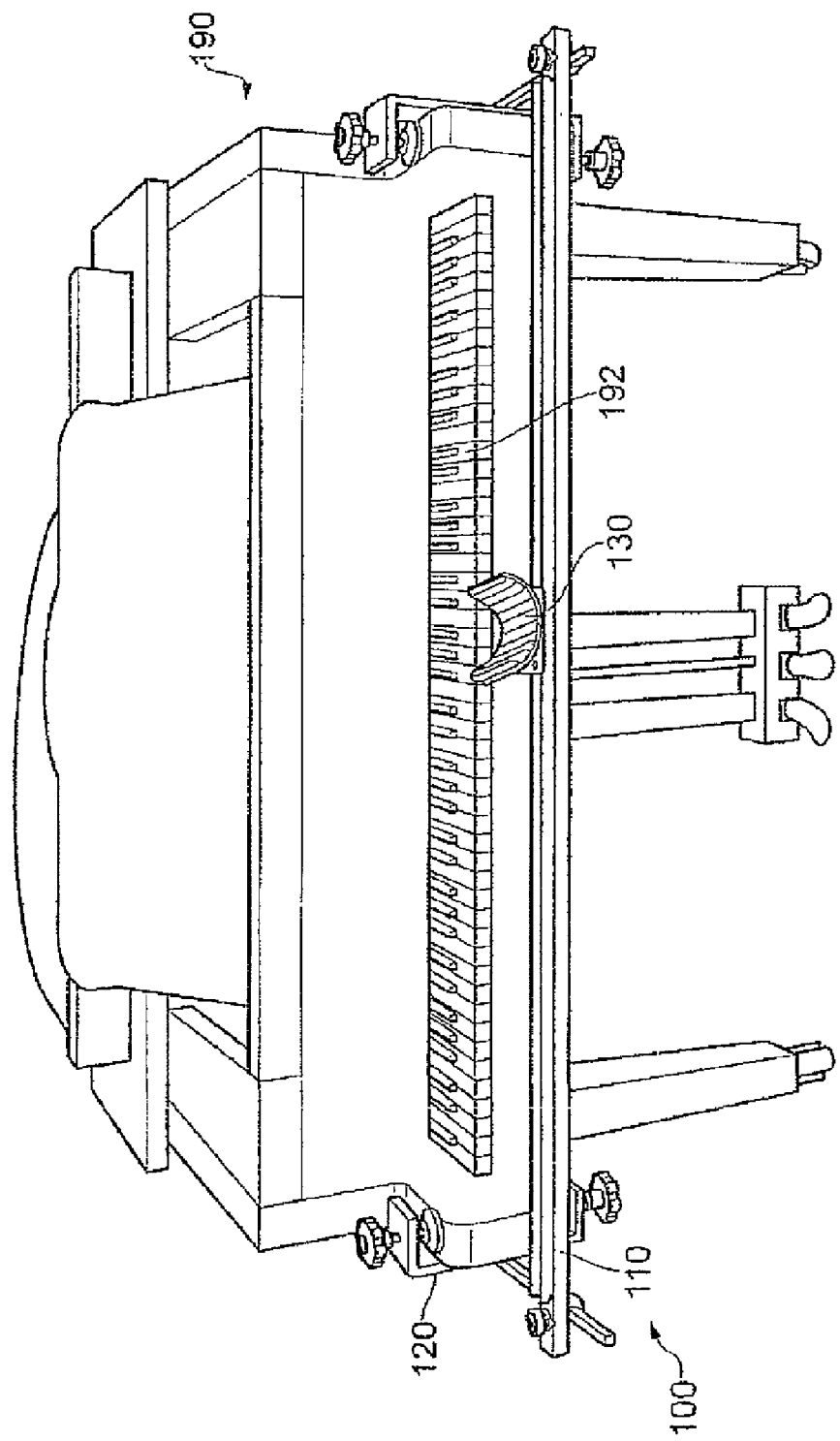
FIG. 1 is a schematic illustration of keyboard practice apparatus of a first embodiment of the invention.
Figure 2:
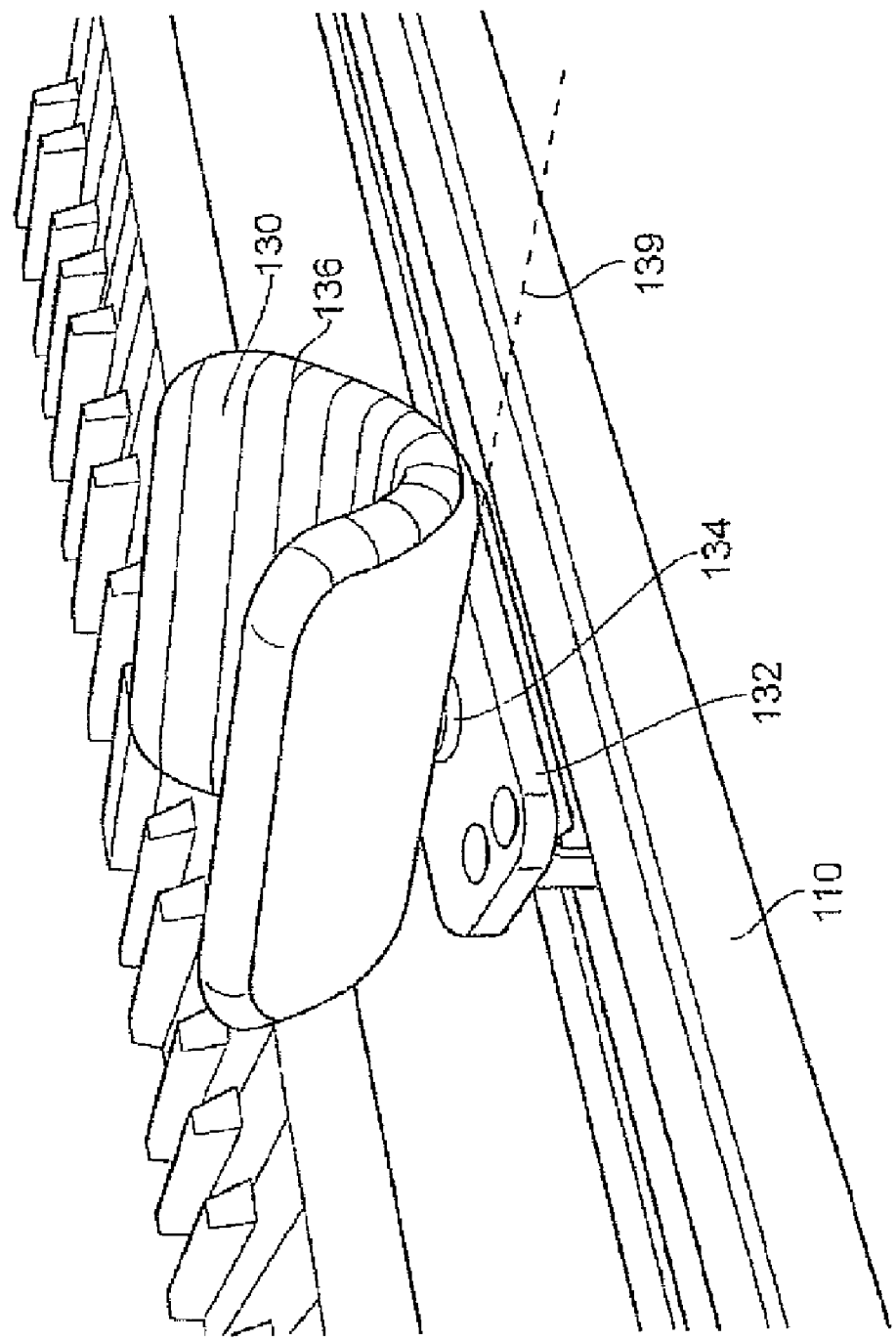
FIG. 2 is an illustration of a support member of the first embodiment.
Figure 3:
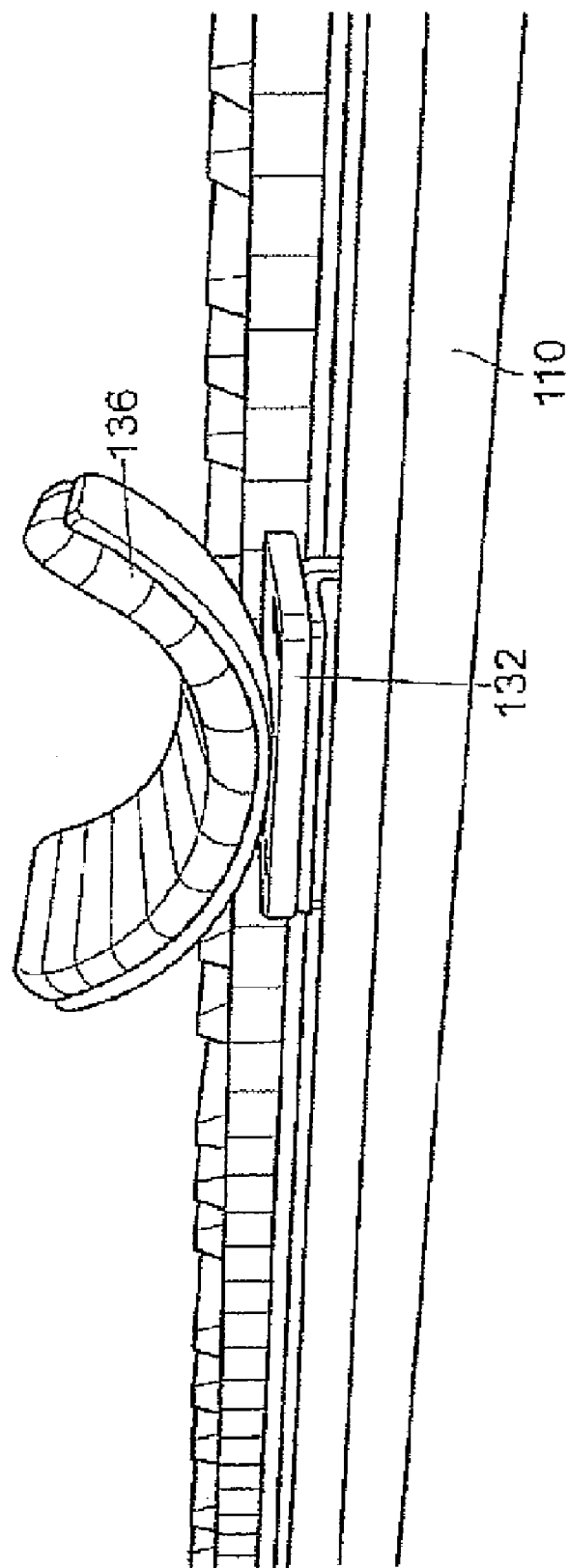
FIG. 3 is a further illustration of a support member of the first embodiment.

In a first embodiment of the invention keyboard practice apparatus is provided as shown generally at 100 in FIG. 1.

The apparatus 100 is provided with a slide member 110 in the form of a rail. The apparatus is also provided with a support member 130 slidably coupled to the rail and movable therealong. The support member 130 is provided with a cushioned U-shaped rest member 136 arranged to support a forearm of a person using the apparatus.

The support member 130 is rotatable about a generally upright axis with respect to an in-use orientation of the apparatus.

The apparatus has a clamp arrangement 120 at each end of the slide member 110. The clamp arrangement 120 is arranged to allow the slide member 110 to be attached to a keyboard instrument 190. The clamp arrangement is configured to grip a portion of the instrument and an end of the slide member 110 thereby allowing the slide member to be supported at a fixed distance from a keyboard 192 of the instrument 190.

The support member 130 is provided with a carriage member 132 that contacts the slide member 110 and is slidable therealong. A pivot element 134 connects the rest member 136 of the support member 110 to the carriage member 132.

Figure 4:
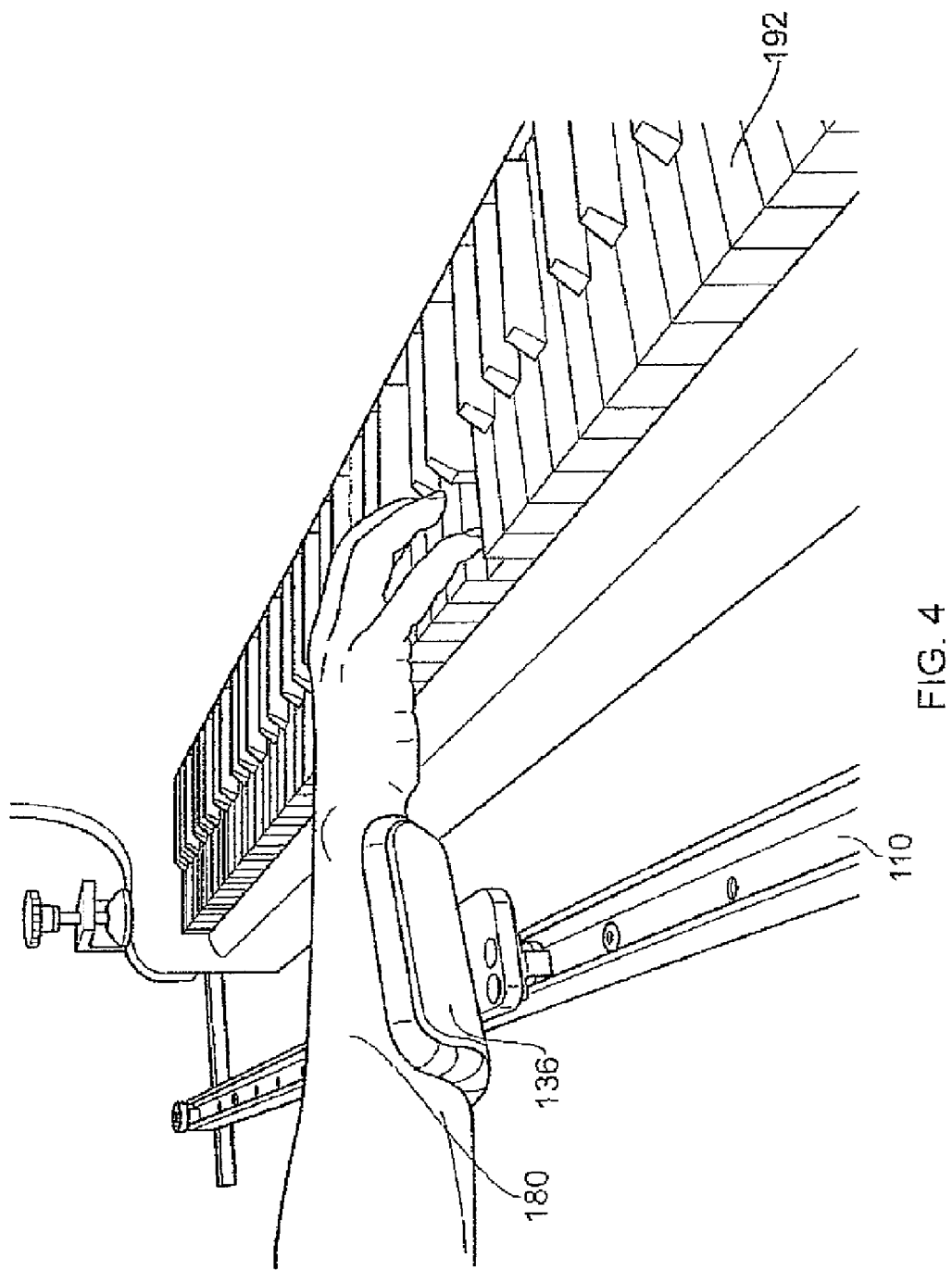
FIG. 4 is an illustration of a support member of the first embodiment.

The rest member 136 is of a size corresponding generally to that of an outer surface of a forearm 180 of a user of the apparatus (see e.g. FIG. 4).

The rest member 136 is configured such that a user resting a forearm 180 in the rest member 136 is able to comfortably move the support member 130 to and fro along the slide member 110 by simply moving their forearm to and fro. Rising portions of the rest member 136 provide surfaces against which a forearm may place pressure without the forearm being required to move substantially with respect to the rest member 136. However, the shape of the rest member 136 is such that the forearm is not hindered excessively in the ability of muscles of the forearm to flex during play.

Figure 5:
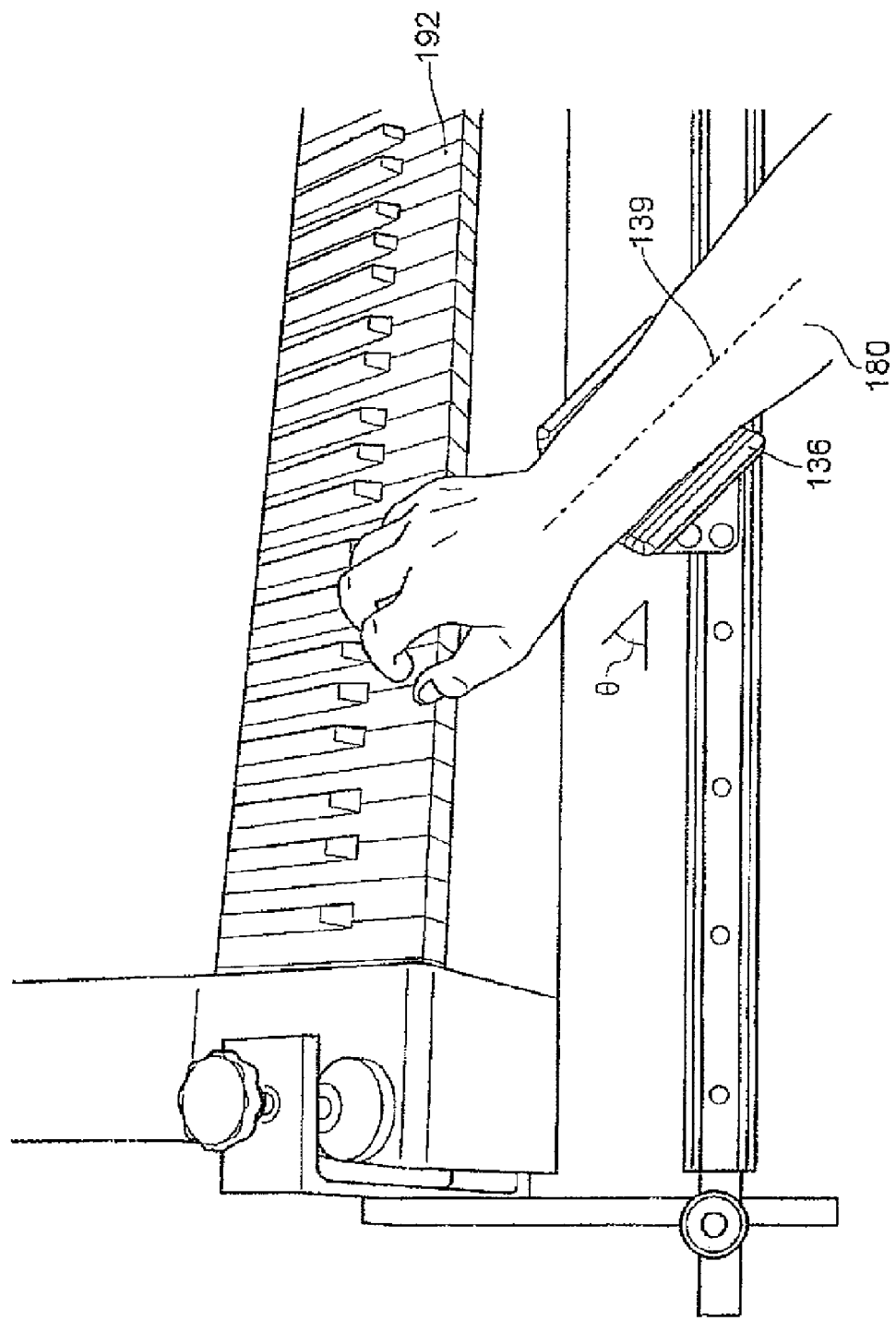
FIG. 5 is a plan view schematic illustration of the apparatus with an arm of a user at a lower end of a keyboard.
Figure 6:
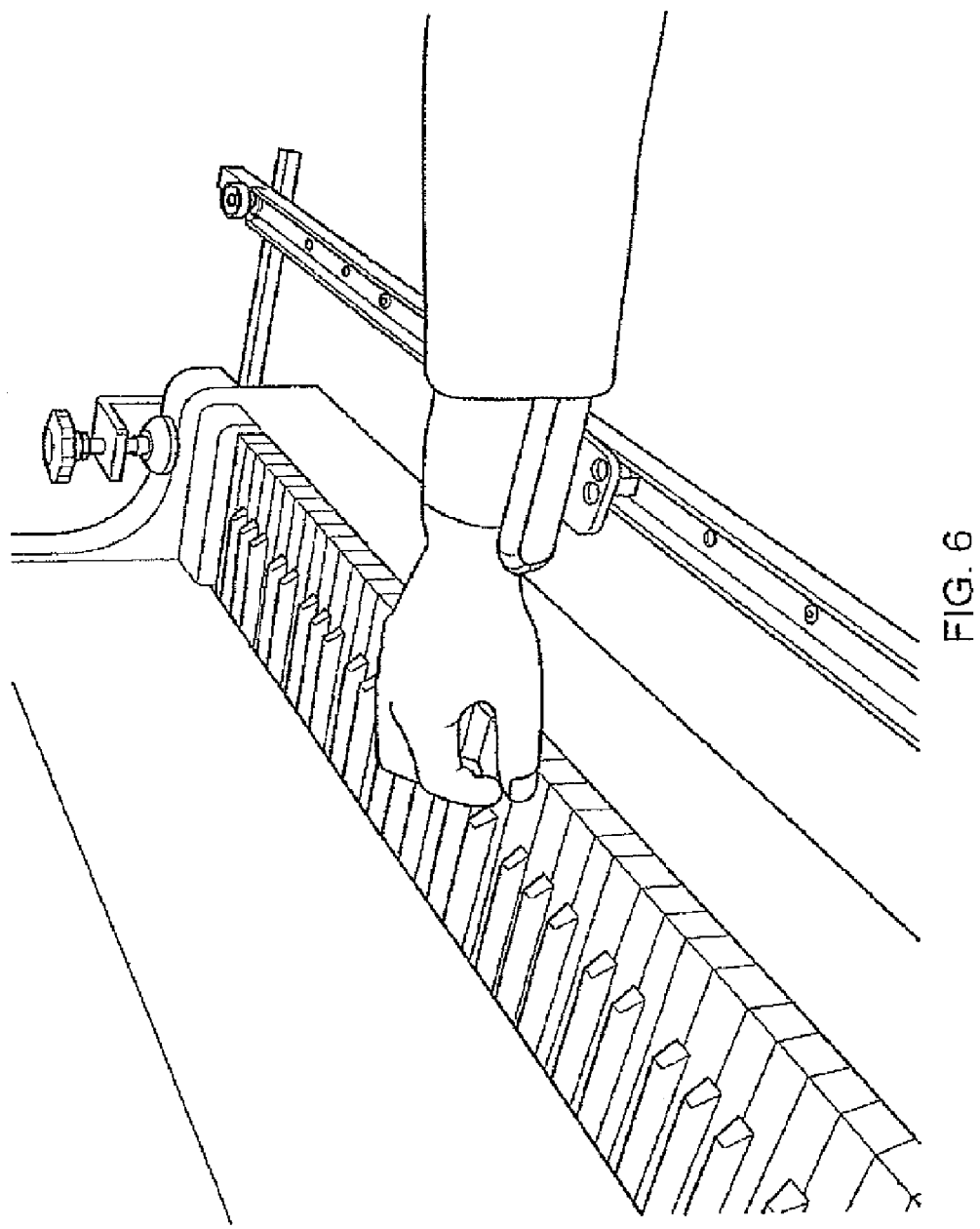
FIG. 6 is a plan view schematic illustration of the apparatus with an arm of a user at a location of the keyboard at which the arm is generally at a right angle to the keyboard.
Figure 7:
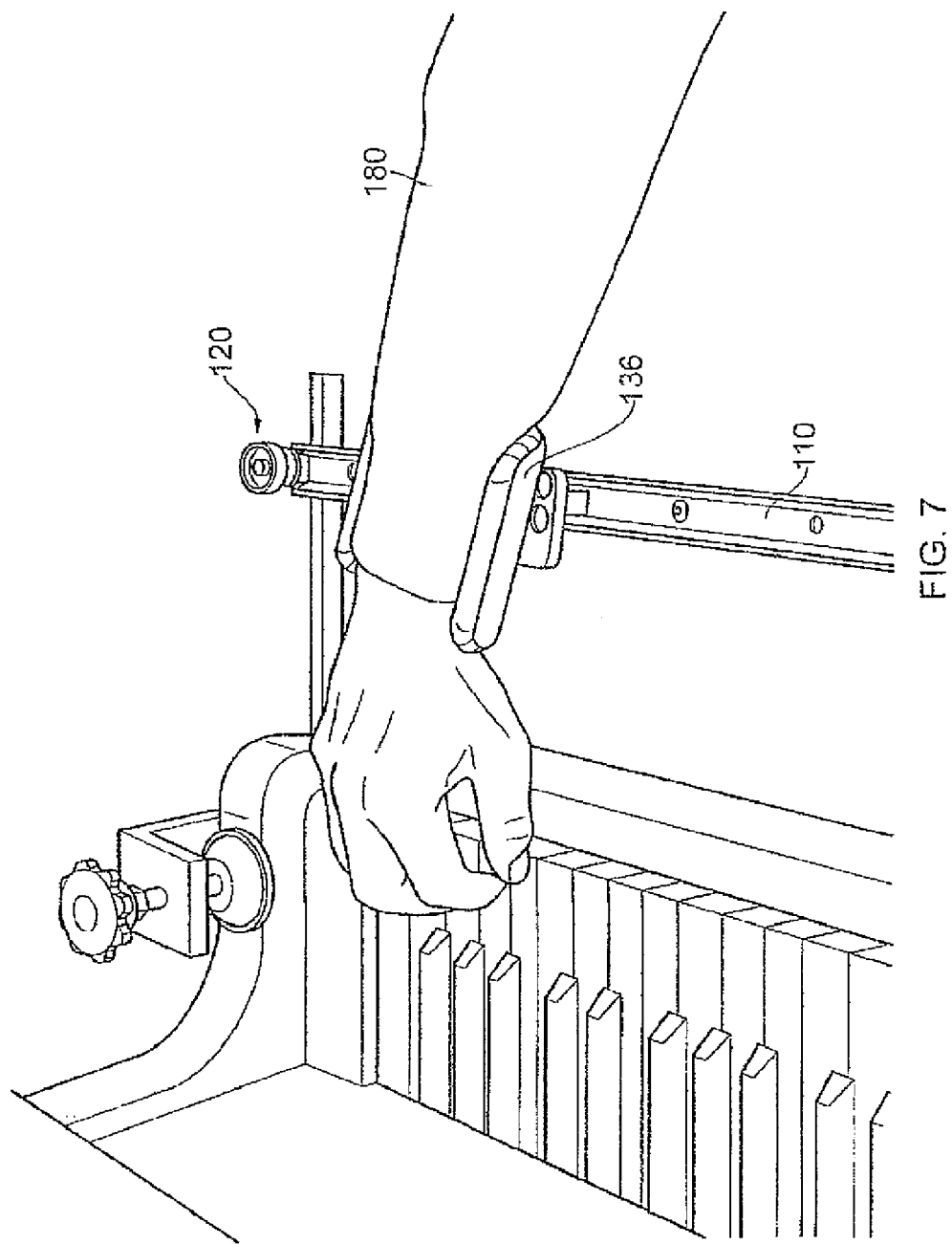
FIG. 7 is a plan view schematic illustration of the apparatus with an arm of a user at an upper end of a keyboard.

FIGS. 5 to 7 illustrate three different positions of the forearm 180 of a player with respect to a keyboard 192. The three positions of the forearm correspond to three different respective rotational positions of the support member 130 with respect to the slide member 110.

In FIG. 5 the support member 130 is shown positioned at a lower position of the keyboard 192 of a piano, i.e. at a location to the left of centre of the keyboard 192. With a user seated substantially centrally with respect to the keyboard, the user's right forearm (indicated at 180 in FIG. 5) crosses in front of the user and causes a longitudinal axis of the support member 130 to be oriented at an angle θ to the slide member 110. In the example shown in FIG. 5 the angle θ is less than 90°.

FIG. 6 shows the orientation of the support member 130 with the user's arm oriented generally at right angles to the slide member 110 (i.e. θ~90°. In the example shown in FIG. 6 the user's body is located generally opposite the key corresponding to 'middle C' and the user's hand is positioned to play a note generally one octave above middle C.

It will be appreciated, however, that the apparatus may be used with a user seated at any position along a length of a keyboard.

FIG. 7 shows the orientation of the rest member 136 at an upper position of the keyboard 192, i.e. at a location to the right of centre of a piano keyboard. The longitudinal axis 139 of the support member 130 is at an angle θ in excess of 90° to the slide member 110.

Figure 8:
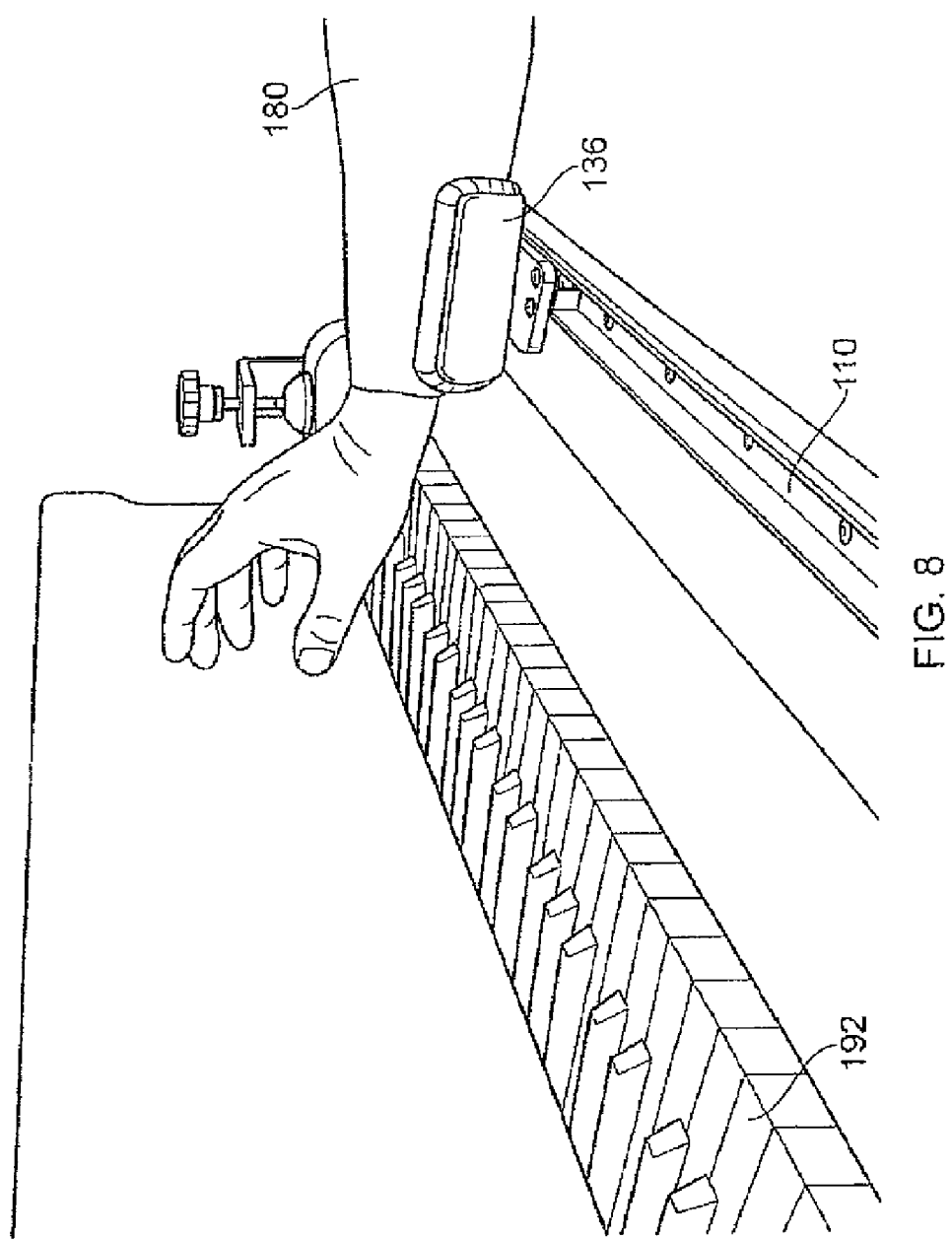
FIG. 8 is a plan view schematic illustration of the apparatus with an arm of a user in a raised position.

Apparatus of the first embodiment of the invention allows considerable flexibility of movement of a user's hand and forearm. In FIG. 8 it can be seen that a user may raise freely raise their hand during the course of play.

Figure 9:
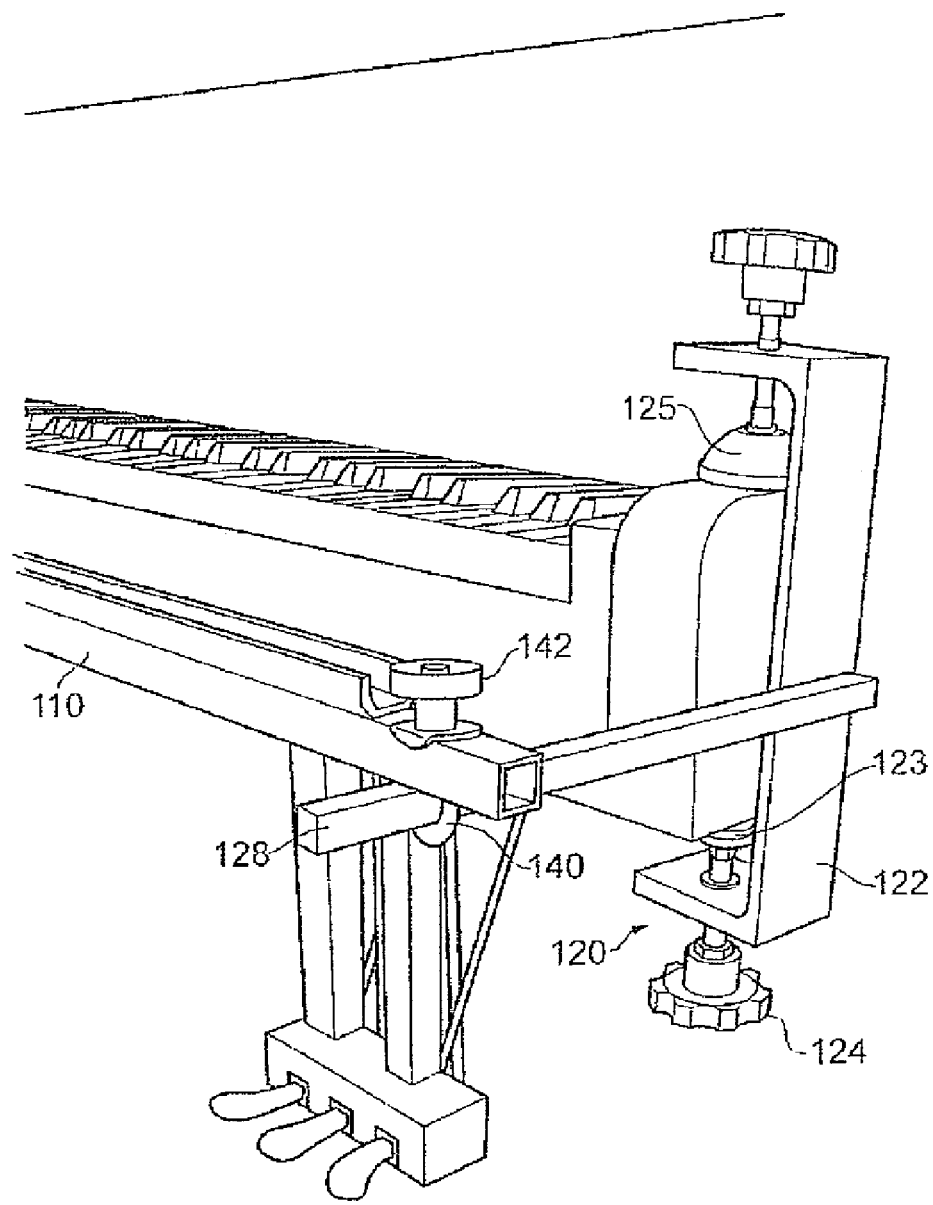
FIG. 9 is a perspective view of a clamp arrangement.
Figure 10:
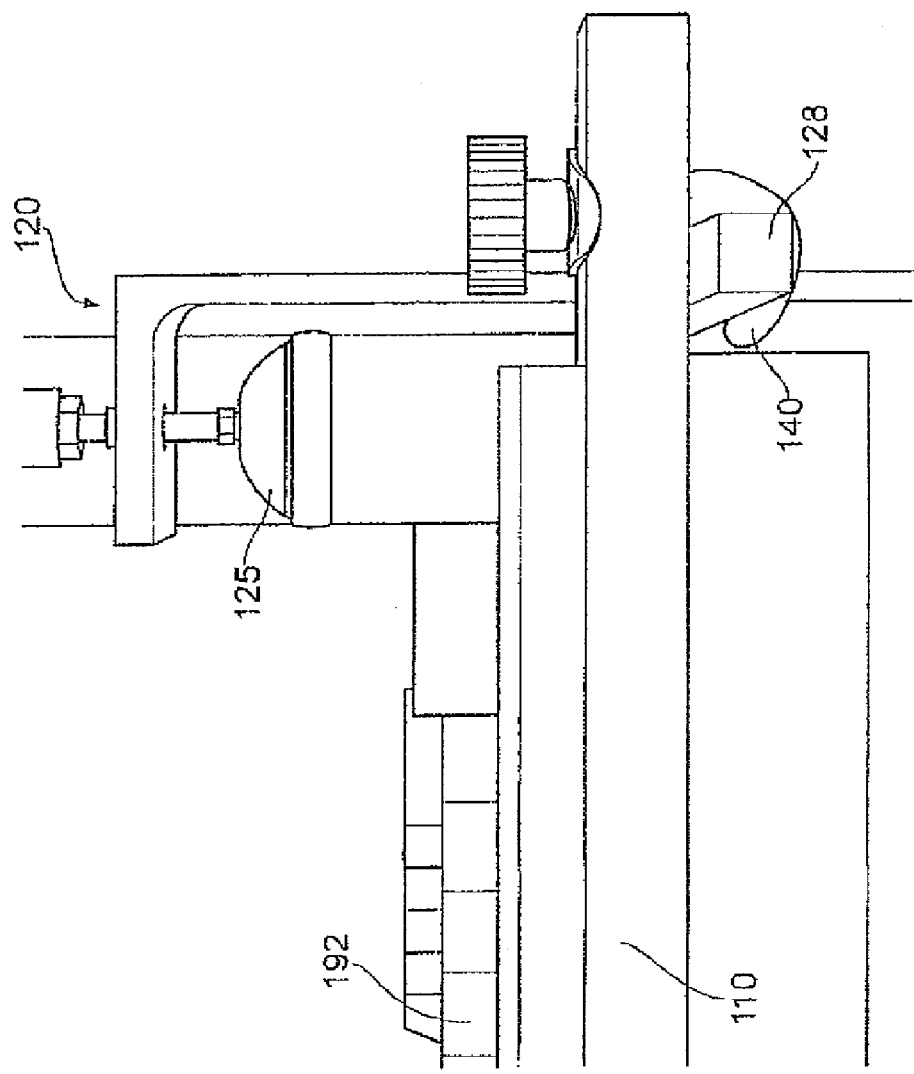
FIG. 10 is a further view of the clamp arrangement of FIG. 9.

The configuration of the clamp arrangement 120 is shown more clearly in FIG. 9. The clamp arrangement 120 has a G clamp portion 122 connected by means of a support arm 128 to the slide member 110. The G clamp portion 122 has a primary grip member 123 operated by means of a rotatable handle 124. The primary grip member 123 of the clamp arrangement 120 is operable by means of rotation of the handle 124 to sandwich a portion of a keyboard instrument between the primary grip member 123 and a secondary grip member 125 at an opposite end of the G clamp portion to the primary grip member 123.

A distance between the primary and secondary grip members 123, 125 can also be varied by translation of the secondary grip member 125 towards or away from the primary grip member 123. This feature allows a vertical position of the slide member 110 of the first embodiment to be adjusted. Thus, the clamp arrangement 120 allows the position of the slide member 110 to be adjusted to suit different shapes of keyboard instrument.

The support arm 128 is connected to the slide member 110 by means of a hook member 140. The hook member 140 is configured to hook underneath the slide member 110 and to urge the slide member 110 against the support arm 128. The hook member 140 has a threaded portion (not shown) that passes through the support arm 128. A handle 142 having a complementary threaded bore is attachable to the threaded portion of the hook member 140 and is operable to urge the slide member 110 against the support arm 128 when the handle is turned in a corresponding direction.

The hook member 140 of each clamp arrangement 120 is operable to grip the support arm 128 from either side of the support arm 128.

The feature of a hook member allows the distance between respective support arms 128 of each of the two clamp arrangements 120 of the apparatus to be varied. The distance between respective support arms 128 will be dependent upon the side of the support arm 128 at which the hook member 140 is placed.

In order to change a side of the support arm from which the support arm 128 is gripped, the handle 142 is loosened and the hook rotated through an angle of 180°.

In some embodiments of the invention a different type of clamp arrangement is used. In some embodiments of the invention the apparatus is arranged to support the slide member 110 in a freestanding manner. That is, it is not required to attach the apparatus to the keyboard instrument 190 in order to position the slide member 110 in juxtaposition with the keyboard 192.

It will be appreciated that a variety of different clamping arrangements may be used in different embodiments of the invention. Different clamping arrangements may be provided depending upon the shape of an instrument with which the apparatus is to be used, such as an upright piano, a grand piano, etc. In some embodiments the clamping arrangement is suitable for upright or grand pianos. Embodiments of the invention are usable with electronic pianos. Embodiments of the invention are usable with organs having one or more keyboards.

Figure 11:
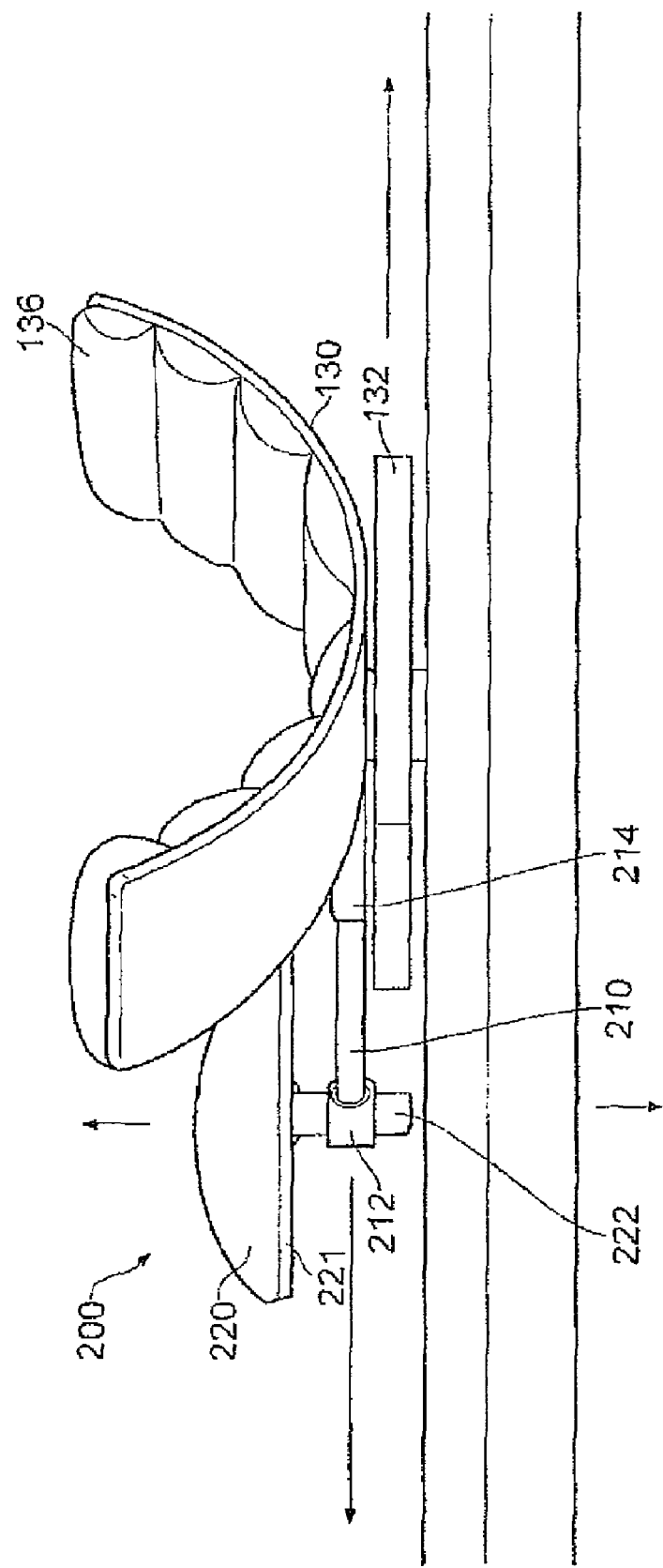
FIGS. 11 and 12 show apparatus according to a further embodiment of the invention.
Figure 12:
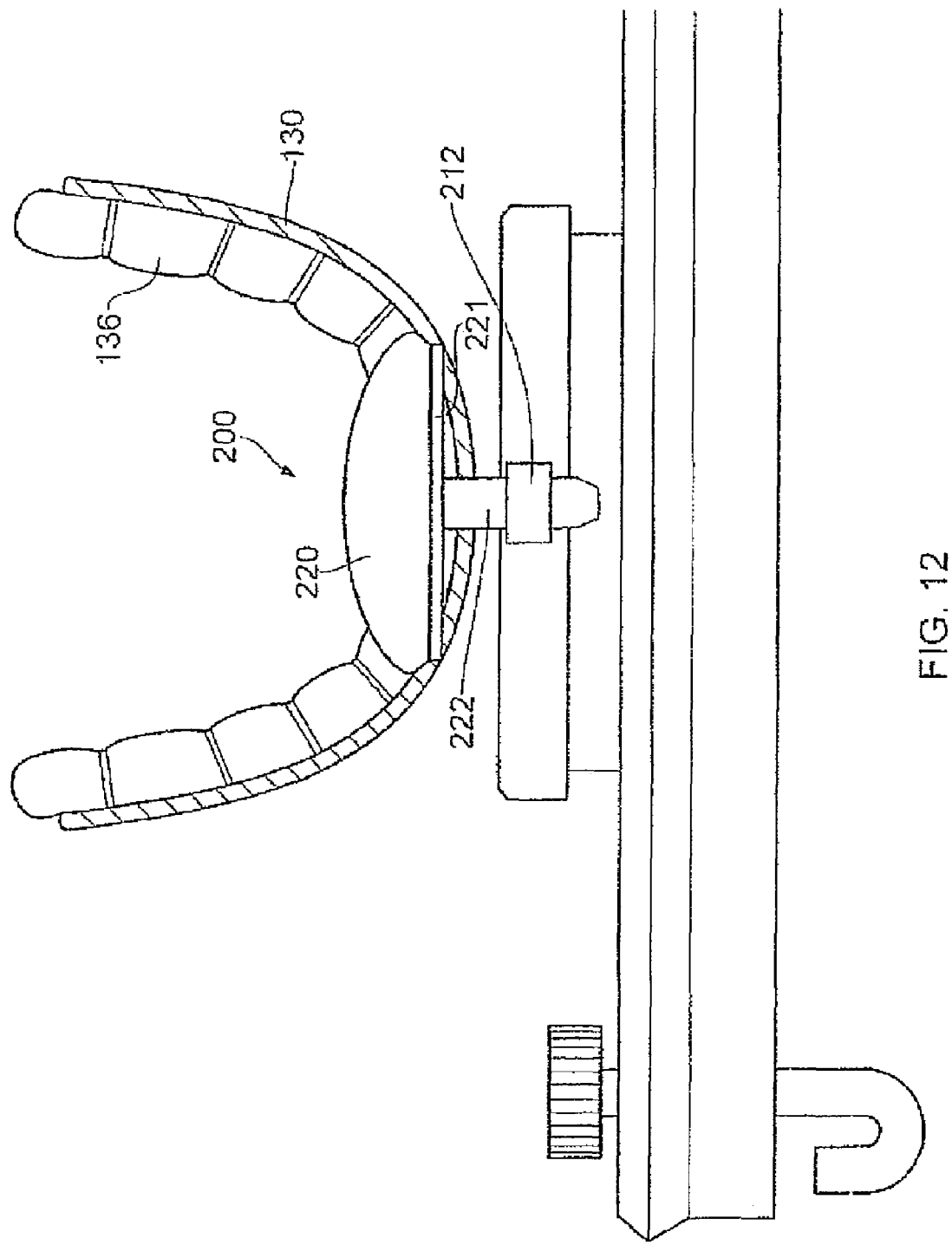

Apparatus of a second embodiment is provided with a handrest 200 as shown in FIG. 11. In the second embodiment, the handrest 200 is removably coupled to the support member 130 by means of a generally rigid coupling. Thus, with the handrest 200 coupled to the support member 130, as the support member 130 moves, either by translation or rotation, the handrest 200 moves in a corresponding manner.

In the second embodiment, the handrest is coupled to the support member 130 by means of a boom member 210 connected directly to the support member 130 and protruding therefrom along the longitudinal axis 139 of the support member 130. A platform member 220 of the handrest 200 is provided with a shaft member 222 protruding away from a rear portion 221 of the platform member 220. The shaft member 222 is coupled to an end of the boom member 210 distal the support member 130 by means of a collar member 212, the shaft member 222 being slidable in the collar and arranged to be fixed at a required position by means of a screw fixing.

The boom member 210 is slidable in a sheath member 214 rigidly coupled to the support member 130. Thus, the distance between the platform member 220 and the support member 130 may be adjusted by sliding the boom towards or away from the support member 130. The boom member 210 may be fixed at a required position by means of a further screw fixing.

The position of the platform member 220 may thereby be adjusted in both a horizontal and vertical direction to suit the size of an individual user.

It will be appreciated that in some embodiments of the invention, adjustment of the position of the shaft member 222 with respect to the collar member 212 and/or the position of the boom member 210 with respect to the sheath member 214 may be made by a variety of different means including quick-release fixings such as screw fixings, snap-tight fixings or any other suitable fixing, and/or by providing the shaft member 222 and/or the boom member 210 with a threaded surface and proving a corresponding threaded bore in the collar member and/or sheath member, respectively. In some embodiments the position of the hand rest is permanently fixed with respect to the support member 130. In some embodiments the handrest 200 is permanently fixed to the support member 130.

Figure 13:
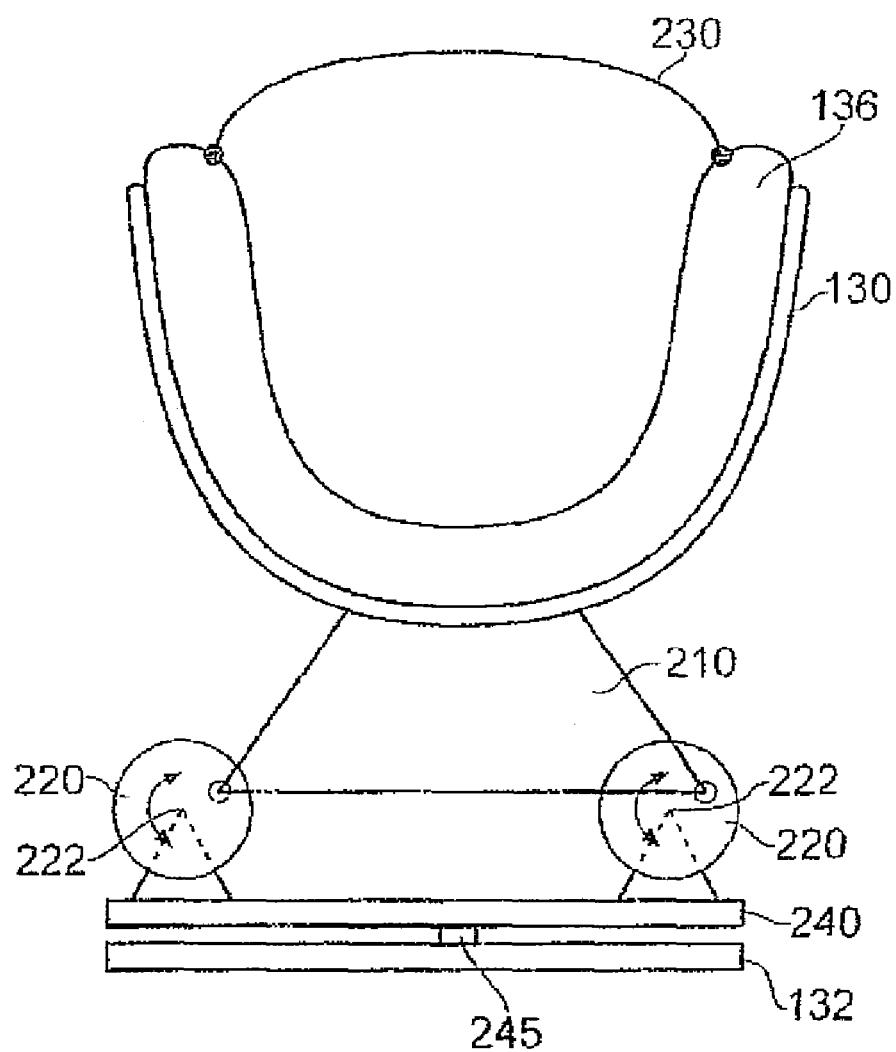
FIGS. 13 and 14 show apparatus according to a further embodiment of the invention having rotator apparatus.

In a further embodiment of the invention shown in FIG. 13, the support member 130 is operable to execute a circular or elliptical motion with respect to the carriage member 132 about an axis parallel to the longitudinal axis 139 of the rest member. Circular motion is particularly helpful in training a player to move their wrists in an exemplary manner whilst playing a keyboard instrument.

In the embodiment of FIG. 13, the support member 130 is provided with a link member 210 connected to a swivel plate 240 that is rotatably coupled to the carriage member 132 by means of a swivel element 245. The link member 210 is coupled to the swivel plate 240 by means of a pair of rotatable disc elements 220. The disc elements 220 are fixed to the swivel plate 240 and provided in spaced apart relation with respect to the carriage member 132. Axes of rotation 222 of the disc elements 220 are arranged to be generally perpendicular to the longitudinal axis 139 of the support member 130. It will be appreciated that the link member 210 is rotatably coupled to each of the disc elements 220.

The link member 210 is connected at respective opposed edges of the link member 210 to corresponding radial positions of each of the disc elements 220.

In some embodiments of the invention two or more disc members are provided along each axis of rotation 222, to provide further support for the support member 130.

The support member 130 is provided with a strap element 230 arranged to fit over a player's arm thereby securing the player's arm to the rest member.

It will be understood that, with a player's arm secured to the support member 130, the apparatus is operable to assist a player in causing his or her arm to execute a predetermined circular motion as the player attempts to move his or her arm to execute generally circular motion.

Figure 14:
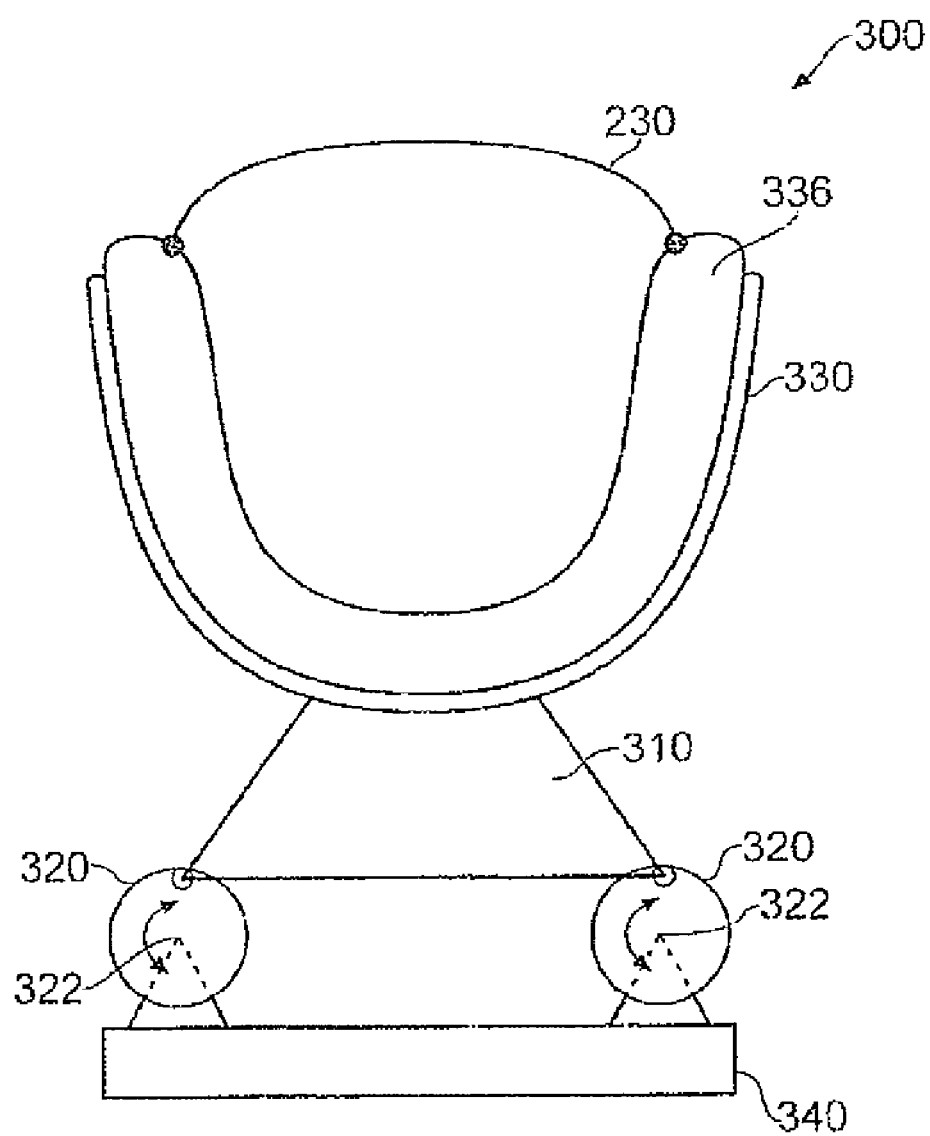

In some embodiments of the invention, apparatus 300 is provided having a support member 330 configured for circular motion with respect to a base 340 (FIG. 14) suitable for placement on a surface such as a table. Such apparatus is operable to allow a user to rehearse the exercise of circular motion by their arms in the absence of a keyboard.

As in the case of the embodiment of FIG. 13, the apparatus has a pair of circular disc elements 320 rotatable about an axis of rotation 322, arranged whereby the axes 322 are in spaced apart relation with respect to the base 340. A link member 310 is rotatably connected at each of a pair of opposed ends to corresponding radial positions of respective disc elements 230.

In use, a user couples one of their arms to the support member 330 by means of strap member 230, whereupon the user may enjoy rehearsal of the required, predetermined circular motion associated with exemplary keyboard technique.

The apparatus 300 may be provided with a handrest according to that described with respect to the second embodiment.

Furthermore it will be appreciated that apparatus according to the embodiment of FIG. 13 may be formed from components interchangeable with those of the first and second embodiments.

In some embodiments, a base 340 is provided to which the support member of the first embodiment may be mounted. It will be appreciated that a wide variety of combinations of components of apparatus according to embodiments of the invention may be made.

It will be appreciated that in some embodiments of the invention a pair of rest members may be provided to allow simultaneous exercise of both arms of a user. In some embodiments, the pair of rest members are provided on a common base.

FIG. 15 to FIG. 18 show an embodiment of the invention arranged to be supported against a keyboard by leaning against the keyboard, instead of being arranged to be attached to the keyboard and supported thereby as in the case of the embodiment of FIG. 1.

The apparatus 400 has a slide member 410 supported by a pair of legs 401 at opposite ends of the slide member 410. Arms 402 are also provided at opposite ends of the slide member 410, the arms 402 being arranged to rest on a portion of the keyboard instrument such as the candleboards of a piano. In some embodiments buffer members 403 are provided on an underside of the arms 402 to avoid damage to the keyboard instrument. In some embodiments suction cups are provided on the underside of the arms 402 to enable the apparatus 400 to be coupled to the keyboard instrument thereby to prevent unwanted movement between the arms 402 and the instrument.

Figure 15:
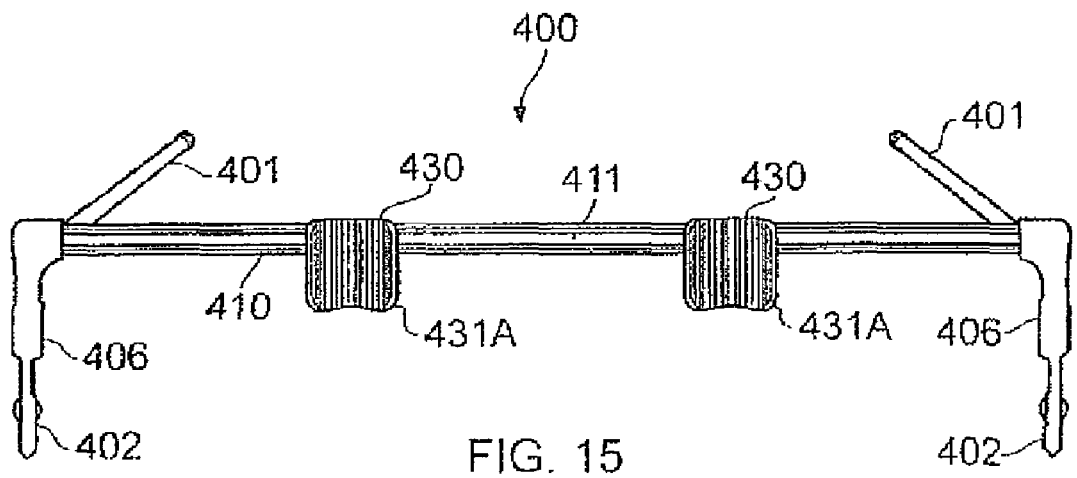
FIGS. 15 to 18 show apparatus according to a further embodiment of the invention arranged to be leaned against a keyboard instrument thereby to support the apparatus in a normal upright orientation.

In the embodiment of FIG. 15 a distance of the slide member 410 from a forward edge of the keyboard of the instrument may be adjusted by means of a rotary handle 406 (FIG. 16) provided on each arm 402. The handles 406 are operable to cause a piston 405 to move towards or away from the slide member 410 in a generally horizontal direction in normal use. The piston 405 is arranged to abut the forward edge of the keyboard of the instrument thereby to support the apparatus against the instrument.

A carriage member 432 is provided (see e.g. FIG. 21, FIG. 22) arranged to be slidable along a track 411 of the slide member 410.

A support member 430 (FIG. 19 to FIG. 22) is provided having a substantially rigid base portion 431 and a pad member 431A coupled thereto, for example by gluing or by means of one or more mechanical fixings. The pad member 431A is arranged to allow a forearm of a user to grip the pad member 431A e.g. by friction. A strap member may also be provided to couple the forearm to the support member 430.

Figure 23:
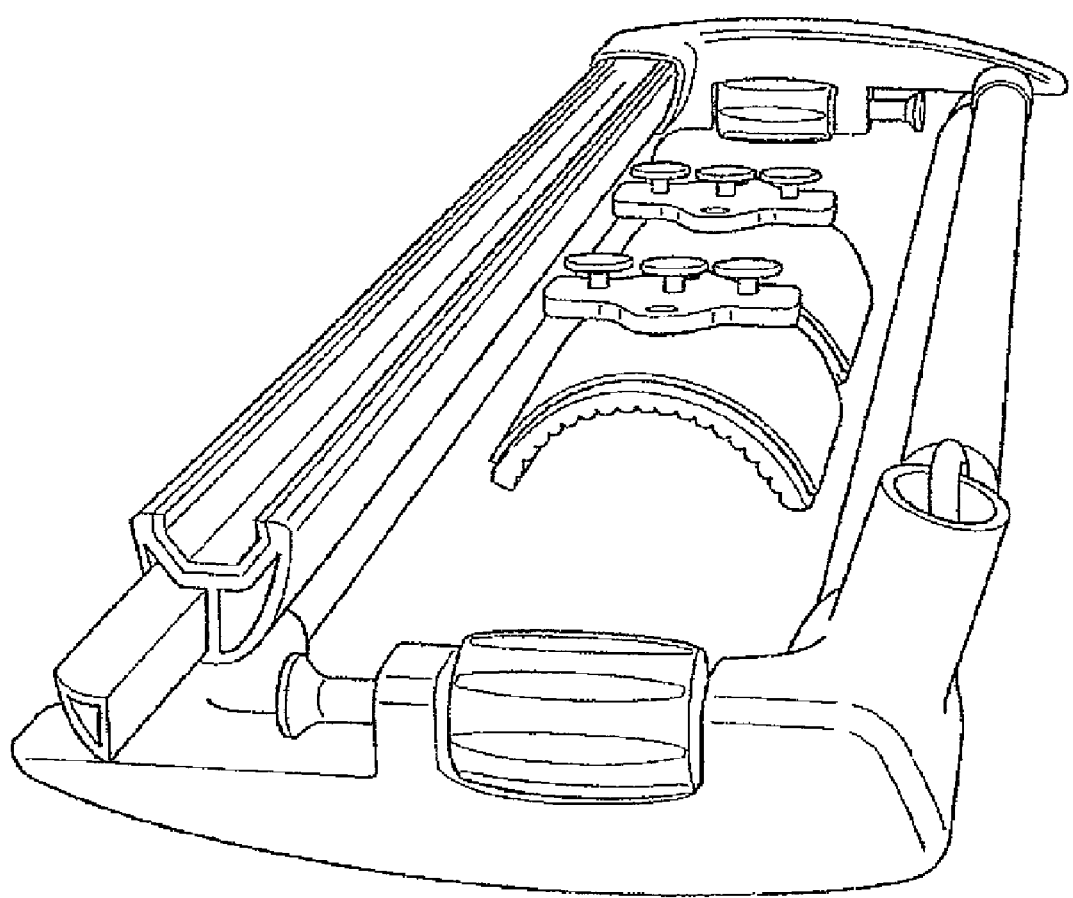
FIG. 23 shows the apparatus of any one of FIGS. 15 to 18 in a folded configuration.

In some embodiments the apparatus 400 is arranged to fold into a relatively flat configuration for storage and transport. FIG. 23 is an illustration of the embodiment of FIG. 15 folded into a flat configuration suitable for storage in a suitable case or 'flat pack' packaging.

Figure 27:
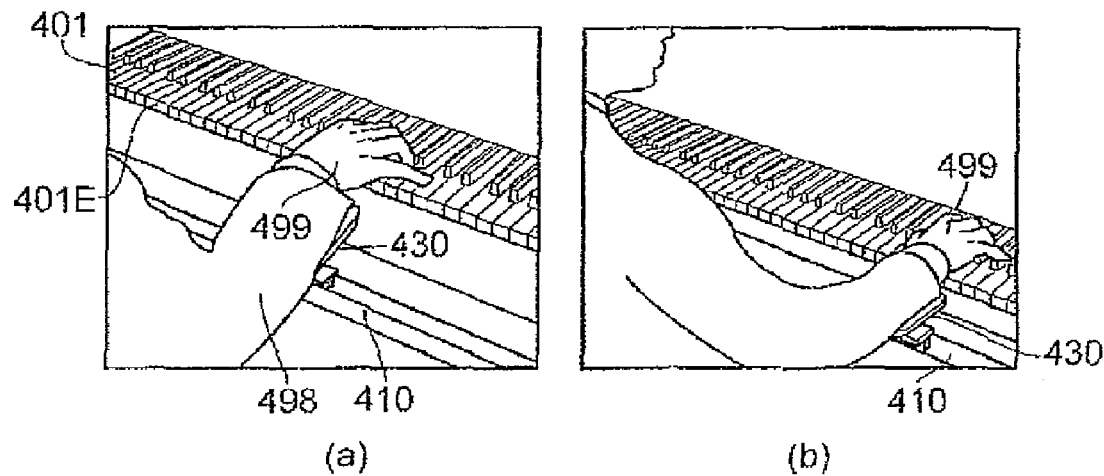
FIG. 27 shows a player using apparatus according to the embodiment of FIG. 15.

FIG. 27 illustrates a user's hand and forearm position when playing scales with apparatus according to an embodiment of the invention. In the images shown, the user's forearm 498 may be seen to be substantially normal to a forward edge 401E of the keyboard 401 and resting in the support member 430. The hand 499 is shown in an orientation in which the thumb and four fingers are each overlying the keyboard 401.

As the user moves their forearm 498 away from their body from the position shown in FIG. 27(a) to that of FIG. 27(b), the support member 430 is moved along the slide member 410. However the user can maintain their forearm substantially normal to the forward edge 401E of the keyboard 401 as they do so, as shown In FIG. 27(b).

Figure 28:
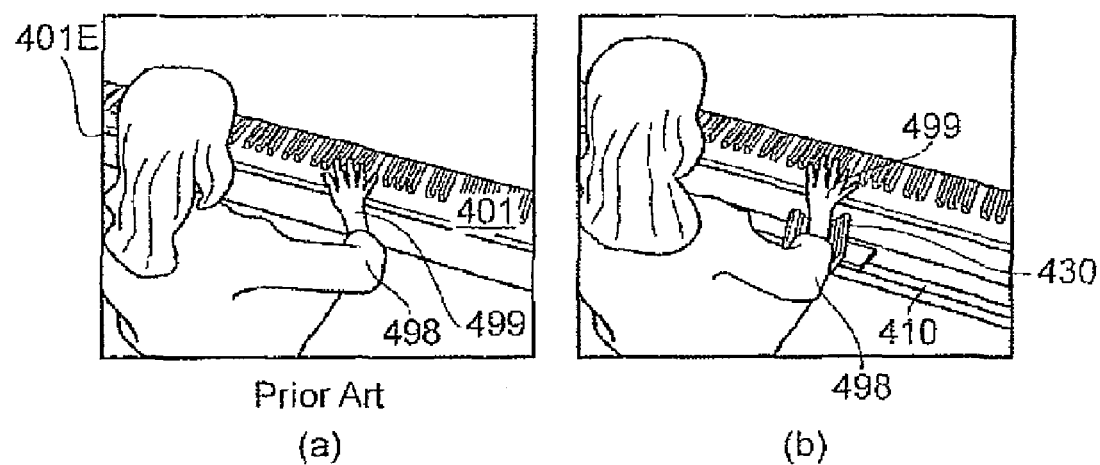
FIG. 28 shows (a) a player playing unaided using incorrect technique and (b) a player playing using correct technique using the apparatus of the embodiment of FIG. 15.

FIG. 28(a) shows a keyboard player not using apparatus according to an embodiment of the invention. Their forearm, being unconstrained, is at an acute angle relative to the forward edge 401E of the keyboard. This position makes keyboard play more difficult at least in part because the thumb must be stretched to reach the keyboard. Indeed, the thumb may not be able to reach the keyboard in such a position.

FIG. 28(a) shows the same player now using apparatus according to the embodiment of FIG. 1 or FIG. 15, where a distance of the forearm from the forward edge 401E of the keyboard is now substantially fixed, allowing the user to more easily maintain the forearm in an orientation substantially normal to the forward edge of the keyboard 401.

Figure 16:
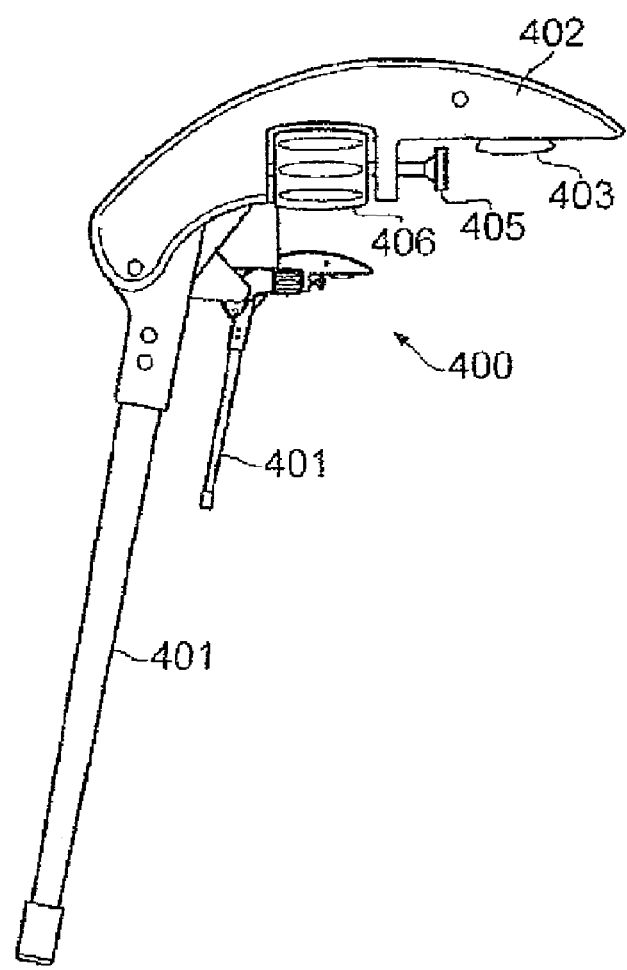
Figure 17:
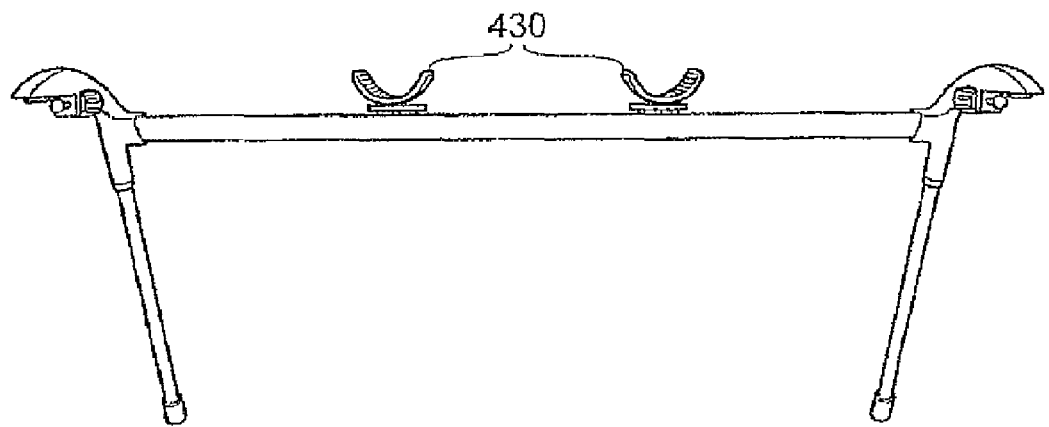
Figure 18:
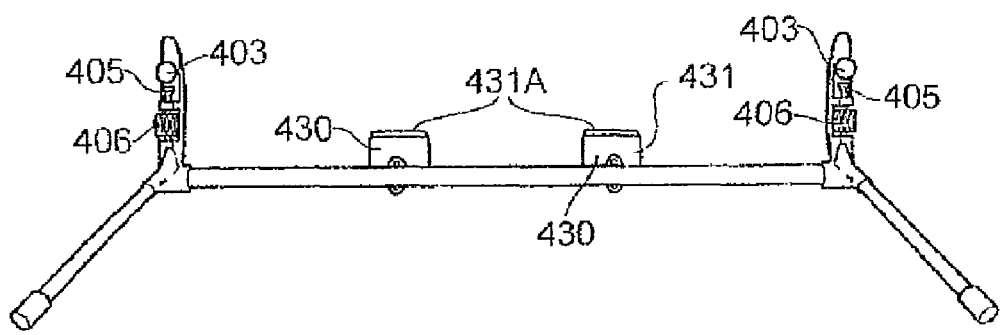
Figure 19:
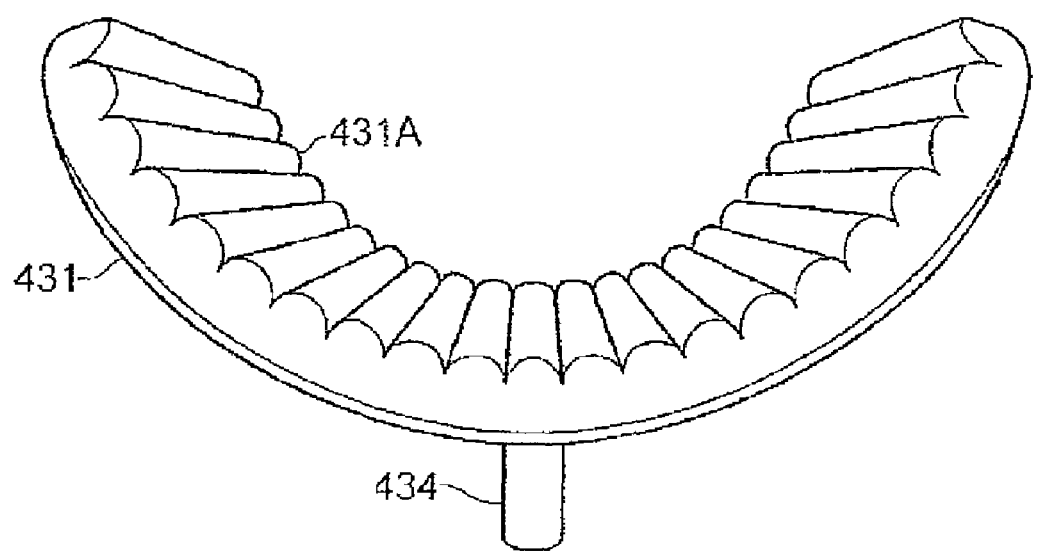
Figure 20:
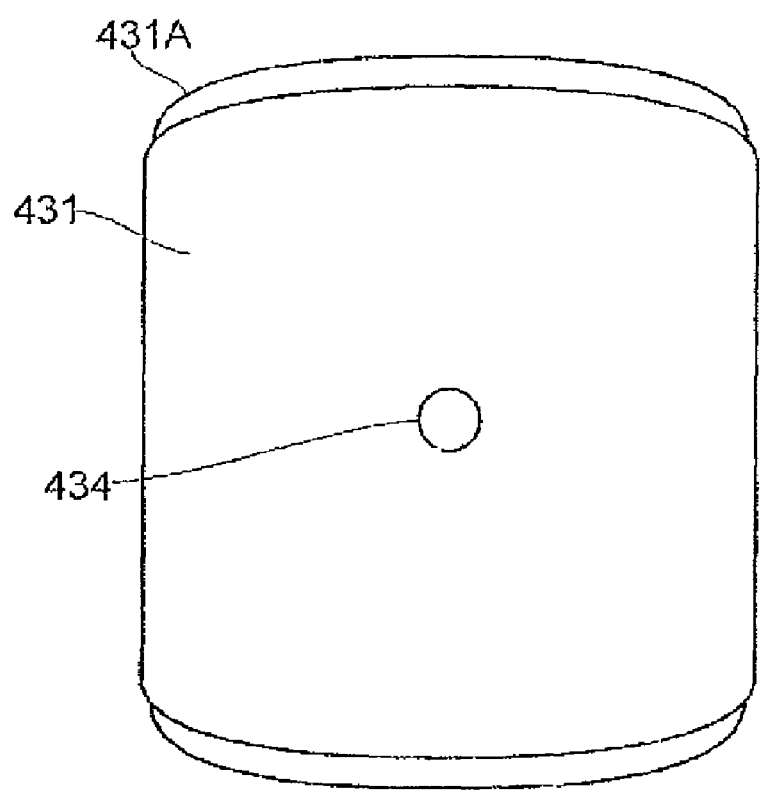
Figure 24:
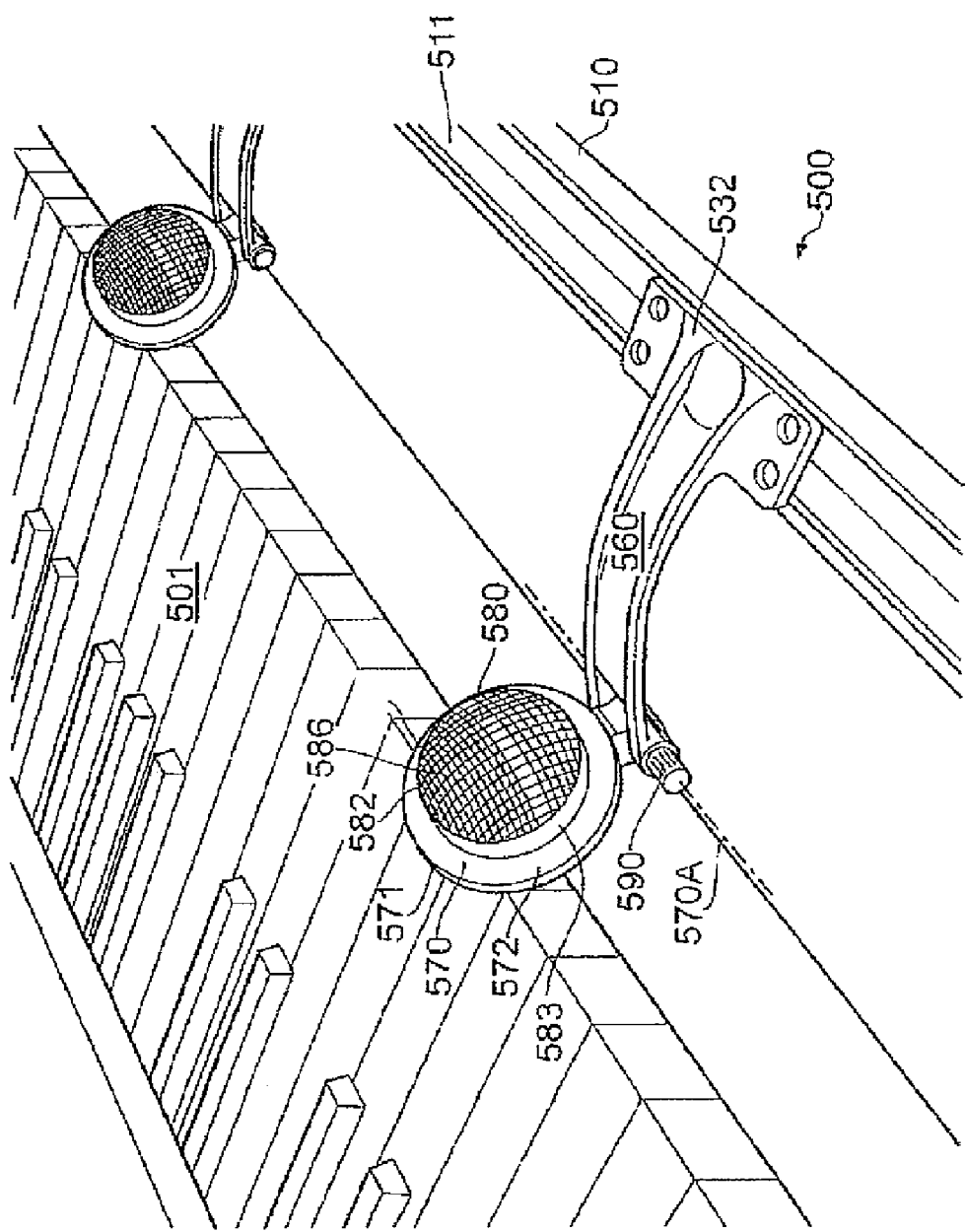
FIG. 24 shows apparatus according to a still further embodiment of the invention.

FIG. 24 shows an embodiment of the invention in which apparatus 500 is provided having a slide member 510 also arranged to be supported in juxtaposition with a keyboard 501 in a similar manner to that of the embodiment of FIG. 15 and FIG. 16. The apparatus 500 of FIG. 24 is similar to that of FIG. 15 except that the apparatus has a support arm 560 coupled to the carriage member 532 instead of the support member 430.

The support arm 560 is arranged to support a hand rest device 570 at a location in juxtaposition with a forward edge of the keyboard.

The hand rest device 570 has a hand rest base member 571 that is in turn arranged to support a hand rest pad member 580. The hand rest base member 571 has a domed surface 572. In some embodiments the domed surface 572 is substantially in the shape of a portion of a sphere. In some embodiments the domed surface 572 is substantially in the shape of a portion of a distorted sphere.

The hand rest pad member 580 is in the form of an inverted cupped member 582 (FIG. 25) having a substantially cylindrical skirt portion 583 provided therearound, the skirt portion 583 having a rim 584 defining a surface of contact between the cupped member 582 and the domed surface 572. The hand rest pad member 580 is resiliently coupled to the base member 571 by a resilient element 575. Other coupling elements are also useful including substantially rigid coupling elements. Alternatively or in addition magnetic coupling may be employed.

It is to be understood that the hand rest device is arranged to be oriented in use substantially as shown in FIG. 24 such that a user may place a palm or other portion of an underside of the user's hand or wrist over the hand rest pad member 580 and move the cupped member 582 over the domed surface. The embodiment of FIG. 24 allows movement of the cupped member 582 over the domed surface in substantially any direction. Thus, a yawing, pitching or rolling motion of the cupped member 582 relative to the domed surface may be executed.

Advantageously, the arrangement allows the cupped member 582 to describe a substantially circular or elliptical path over the domed surface 572. This motion may be performed in such a manner that the user's wrist describes a substantially circular or elliptical motion in a substantially vertical plane parallel to the forward edge of the keyboard. Such a motion is useful in developing and maintaining a flexible wrist as part of a user's keyboard skills.

Figure 25:
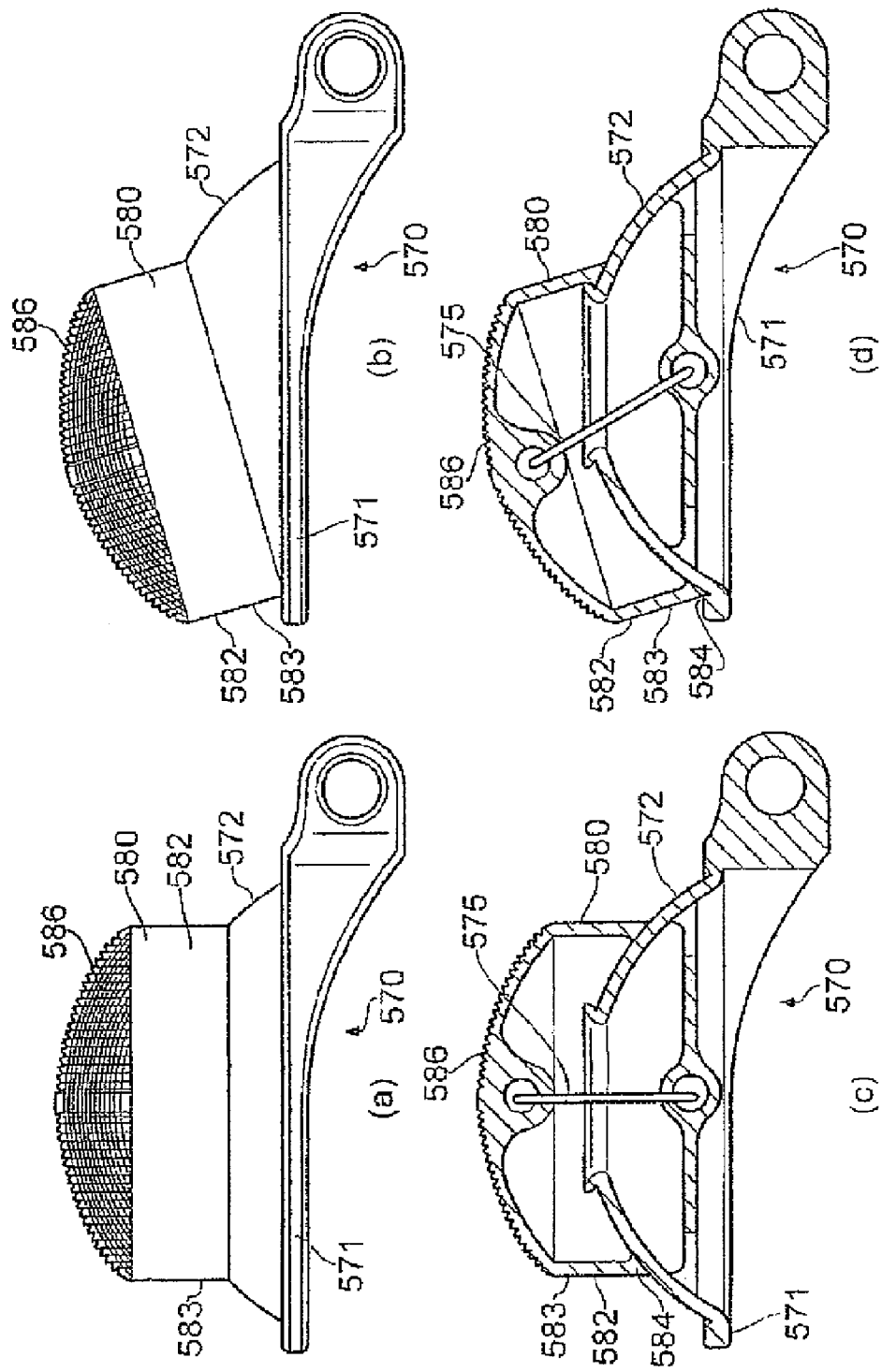
FIG. 25 shows a support member of the embodiment of FIG. 24 showing (a) a side view with a hand rest portion in a central or neutral position; (b) a side view with the hand rest portion in tilted position; (c) a cross-sectional view with the hand rest portion in the central or neutral position and (d) a cross-sectional view with the hand rest portion in the tilted position.

In some embodiments the hand rest pad member 580 is provided with a roughened surface 586 as shown in FIG. 24 and FIG. 25 to facilitate a user's grip of the pad member 580. The roughened surface may be provided on a member that is rotatable with respect to the cupped member 582, for example about a cylindrical axis of the cupped member 582.

The feature of a roughened surface can be useful since a user may perspire during use of the apparatus resulting in the possibility of slippage of the underside of the user's hand over the pad member 580.

In the embodiments of FIG. 24 the hand rest base member 571 is arranged to be hingedly coupled to the support arm 560 of the apparatus 500. The hand rest base member 571 may be pivoted about an axis 570A arranged to be parallel to the forward edge of the keyboard and substantially horizontal with the apparatus arranged in normal use, and fixed at one of a range of angles with respect to a vertical plane according to a user's requirement using a finger screw mechanism 590 whereby the screw may be tightened to lock the hand rest base member 571 at a required angle. In some embodiments the angle of the base member 571 relative to the support arm 560 is indexed. Typically an angle of the base member 571 of substantially 45° with respect to the vertical plane is preferred in normal use. Other angles are also useful, for example in the range from substantially 40° to 50°, 30° to 60° or 20° to 80°.

In some embodiments the hand rest base member 571 and/or the support arm 560 is arranged to rest against a portion of the instrument to which the apparatus is mounted. This has the advantage that an amount of mechanical strain on the support arm 560 may be reduced. Other arrangements are also useful.

It is to be understood that the embodiments of FIG. 15 and FIG. 24 are arranged such that the support member 430 of the embodiment of FIG. 15 may be substituted for the support arm 560 and hand rest device 570 of the embodiment of FIG. 24. In other words the components are interchangeable allowing conversion of the apparatus from one embodiment to the other. A similar interchangeability may be arranged with a support arm 660 of the embodiment of FIG. 26 (described below).

Figure 26:
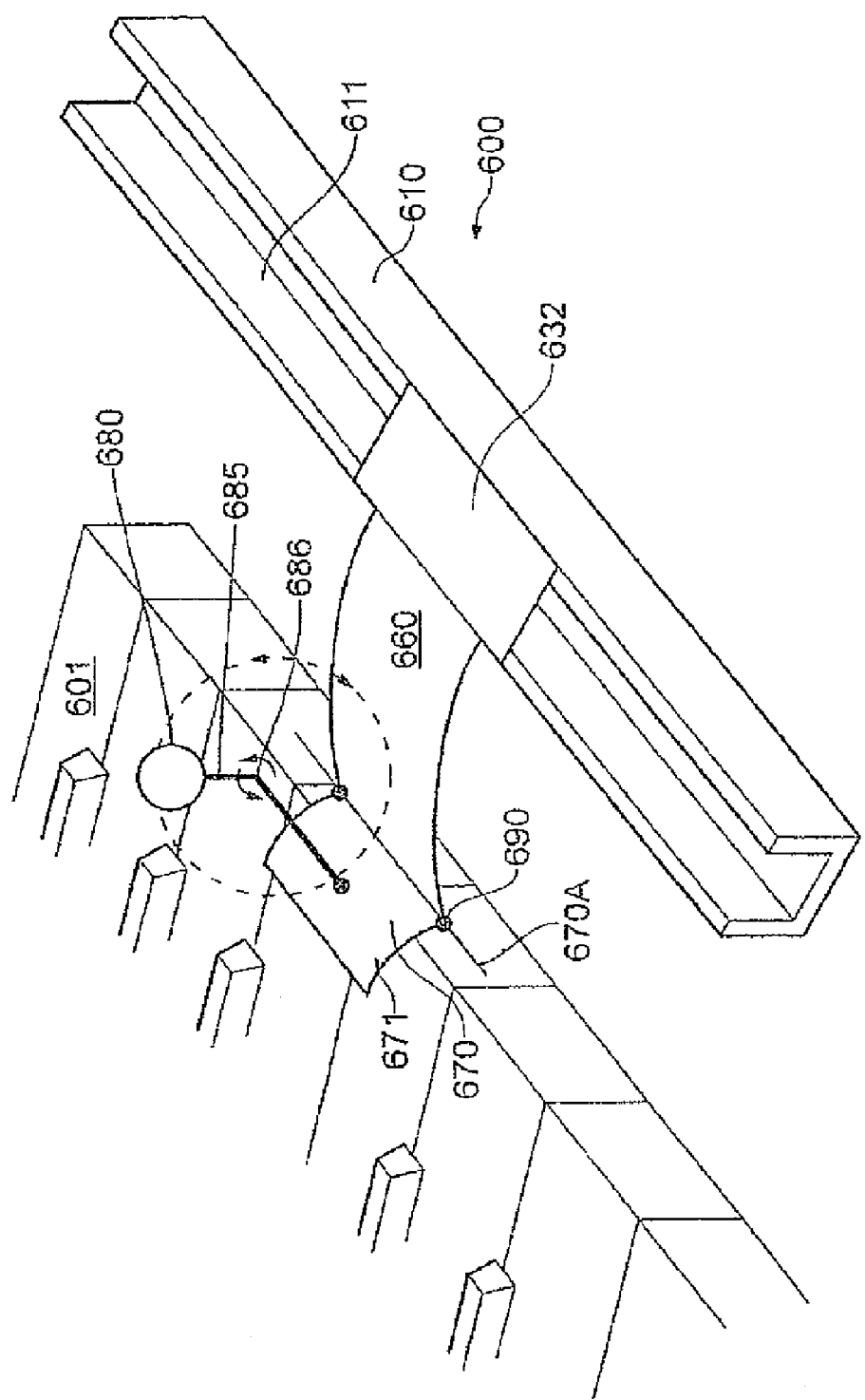
FIG. 26 shows apparatus according to a further embodiment of the invention.

FIG. 26 shows apparatus 600 according to an embodiment of the invention in which a slide member 610 having a track member 611 similar to that of the embodiments of FIG. 15 and FIG. 24 is supported parallel to a forward edge of a keyboard 601. The apparatus 600 has a carriage member 632 reciprocally slidable along the slide member 610 and a support arm member 660 similar to that of the embodiments of FIG. 15 and FIG. 24.

A hand rest device 670 is provided having a base member 671 that may be pivoted about a substantially horizontal axis 670A when oriented in normal use, as in the case of the embodiments of FIG. 15 and FIG. 24. That is, the base member 671 may be pivoted about the horizontal axis 670A which is arranged to be parallel to the forward edge of the keyboard with the apparatus arranged in normal use. The base member 671 may be fixed at one of a range of angles with respect to a vertical plane according to a user's requirement using a finger screw mechanism 690 whereby the screw may be tightened to lock the hand rest base member 671 at a required angle.

The hand rest device 670 is provided with a spindle member 685 rotatably coupled to the base member 671. The spindle member 685 has a bend portion 686 and a hand rest pad member 680 provided at a free end of the spindle member 685. It is to be understood that rotation of the spindle member causes the pad member 680 to describe rotational translational motion in a plane due to the presence of the bend portion 686 of the spindle member 685. Thus, the pad member 680 is supported at a location displaced from the axis of rotation of the spindle member 685 in a direction substantially normal to the axis of rotation of the spindle member 685.

It is to be understood that the embodiment of FIG. 26 does not allow a user's hand to describe the same range of different movements allowed by the embodiment of FIG. 24 and FIG. 25, the apparatus of FIG. 24 and FIG. 25 being a preferred embodiment of the invention.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

What is claimed is:

1. Keyboard practice apparatus comprising:
   a slide member;
   a support member configured to support an arm of a user, the support member being slidably coupled to the slide member; and
   means for supporting the slide member in juxtaposition with a keyboard of an instrument,
   the apparatus being operable to allow a player of a keyboard instrument in a seated position with a forearm resting on the support member to move their forearm along a length of the keyboard by sliding the support member along a portion of a length of the slide member such that the forearm is moved while the apparatus maintains the forearm to be at a substantially constant distance from a forward edge of the keyboard.

2. Apparatus as claimed in claim 1 configurable to allow the support member to be reciprocally slidable along the slide member at a substantially constant vertical height with respect to the keyboard.

3. Apparatus as claimed in claim 1 configurable to allow the support member to be reciprocally slidable along the slide member in a generally curved path.

4. Apparatus as claimed in claim 1 configurable to allow the support member to be reciprocally slidable along the slide member at a substantially constant lateral distance from a forward edge of the keyboard.

5. Apparatus as claimed in claim 1 wherein the support member is removably attachable to the slide member.

6. Apparatus as claimed in claim 5 wherein the support member is removably attachable to the slide member by means of a quick release mechanism.

7. Apparatus as claimed in claim 1 wherein the support member is attached to the slide member by means of a carriage member slidable along the slide member.

8. Apparatus as claimed in claim 7 wherein the support member is removably attachable to the carriage member.

9. Apparatus as claimed in claim 8 wherein the support member is removably attachable to the carriage member by means of a quick release mechanism.

10. Apparatus as claimed in claim 7 wherein the slide member comprises at least one track member, the carriage member being configured to be coupled to the track member.

11. Apparatus as claimed in claim 1 wherein the support means is configured to allow the apparatus to be attached to a keyboard instrument thereby to support the slide member in juxtaposition with the keyboard.

12. Apparatus as claimed in claim 11 wherein the support means is configured to allow the apparatus to be removably attached to the instrument.

13. Apparatus as claimed in claim 1 arranged to be leaned against a keyboard instrument whereby the apparatus is supported in a substantially upright orientation.

14. Apparatus as claimed in claim 1 wherein the support means is configured to allow the apparatus to be positioned in a freestanding configuration.

15. Apparatus as claimed in claim 11 wherein a lateral distance of the slide member from the keyboard may be adjusted.

16. Apparatus as claimed in claim 15 wherein the lateral distance of the slide member from the keyboard may be adjusted by means of a screw mechanism.

17. Apparatus as claimed in claim 11 wherein a vertical height of the slide member with respect to the keyboard may be adjusted, preferably by means of a screw mechanism.

18. Apparatus as claimed in claim 1 wherein the support member is in the form of a generally U shaped member arranged to provide a comfortable rest for the arm of the user.

19. Apparatus as claimed in claim 18 wherein the support member comprises at least one pad portion arranged to be positioned at at least one location selected from amongst beneath the arm of the user and at one or both sides of the arm of the user.

20. Apparatus as claimed in claim 1 wherein the support member is configured to be rotatable with respect to the slide member about an axis, preferably a substantially vertical axis.

21. Apparatus as claimed in claim 1 comprising a plurality of support members.

22. Apparatus as claimed in claim 21 having two support members coupled to one another such that sliding of one support member along the slide member causes sliding of the other support member along the slide member.

23. Apparatus as claimed in claim 22 wherein two of the support members may be resiliently coupled to one another.

24. Apparatus claimed in claim 22 wherein the support members may be rigidly coupled to one another.

25. Apparatus as claimed in claim 22 arranged to allow the support members to be coupled to one another with different respective distances between the support members according to a user's requirement.

26. Apparatus as claimed in claim 25 wherein the support members may be coupled to one another at a prescribed distance between the support members corresponding to at least one selected from amongst a third, a fourth a fifth, a sixth, a seventh and an octave.

27. Apparatus as claimed in claim 1 further comprising a handrest member configured to support a hand of the user when a corresponding arm of the user is resting on the support member.

28. Apparatus as claimed in claim 27 wherein the handrest member is connected to the support member.

29. Apparatus as claimed in claim 28 wherein the handrest member is removably connected to the support member.

30. Apparatus as claimed in claim 28 wherein the handrest member comprises a boom element connected to the support member at a first end of the boom element and a pad member connected to the support element at a second end of the boom element, the pad member being configured to contact a hand of the user thereby to support the hand.

31. Apparatus as claimed in claim 30 wherein the pad member is shaped and configured to support a palm of a user's hand.

32. Apparatus as claimed in claim 30 wherein a position of the pad member with respect to the support member may be adjusted in a vertical and/or a horizontal plane.

33. Apparatus as claimed in claim 1 further comprising rotator apparatus configured to allow a wrist of a user to describe generally circular or elliptical translational motion in a vertical plane parallel to the slide member.

34. Apparatus as claimed in claim 33 wherein the rotator apparatus is further arranged to maintain the support member in a generally upright orientation throughout a cycle of circular or elliptical translational motion.

35. Apparatus as claimed in claim 33 wherein the rotator apparatus comprises a parallel linkage mechanism.

36. Apparatus as claimed in claim 35 wherein at least one of the linkages of the linkage mechanism is provided in the form of a rotatable disc element.

37. Apparatus as claimed in claim 35 wherein a pair of generally parallel linkages of the parallel linkage mechanism are provided by a corresponding pair of mutually spaced apart rotatable disc elements, the disc elements being configured to be rotatable about mutually parallel axes.

38. Apparatus as claimed in claim 37 wherein the disc elements are rotatably coupled to the carriage member.

39. Apparatus as claimed in claim 38 wherein the disc elements are rotatably coupled to a swivel member, the swivel member being configured to be rotatable with respect to the carriage member about a generally upright axis with the apparatus oriented for normal use.

40. Apparatus as claimed in claim 1 wherein the support member is provided with a strap member, the strap member being arranged to secure an arm of a user to the support member thereby to prevent inadvertent withdrawal of the arm of a user from the support member.

41. A musical instrument comprising:
a slide member;
a support member configured to support an arm of a user, the support member being slidably coupled to the slide member; and
means for supporting the slide member in juxtaposition with a keyboard of the instrument,
the apparatus being operable to allow a player of the instrument in a seated position with a forearm resting on the support member to move their forearm along a length of the keyboard by sliding the support member along a portion of a length of the slide member in a substantially straight path such that the apparatus maintains the forearm at a substantially constant distance from a forward edge of the keyboard.

42. Apparatus as claimed in claim 1 wherein the support member is rotatably mounted about a pivot element, the support member having a longitudinal axis, and being operable to move from a first position in which said axis of said support member is oriented at an angle of less than 90° to a longitudinal axis of the slide member, into a second position wherein the longitudinal axis of the support member is substantially perpendicular to the longitudinal axis of the slide member.

43. Keyboard practice apparatus comprising:
a slide member;
a support member configured to support an arm of a user, the support member being slidably coupled to the slide member, wherein the support member is rotatably mounted about a pivot element, the support member having a longitudinal axis, and being operable to move from a first position in which said axis of said support member is oriented at an angle of less than 90° to a longitudinal axis of the slide member, into a second position wherein the longitudinal axis of the support member is substantially perpendicular to the longitudinal axis of the slide member; and
means for supporting the slide member in juxtaposition with a keyboard of an instrument,
the apparatus being operable to allow a player of a keyboard instrument in a seated position with a forearm resting on the support member to move their forearm along a length of the keyboard by sliding the support member along a portion of a length of the slide member.

* * * * *